(12) United States Patent
Xie

(10) Patent No.: US 6,674,968 B1
(45) Date of Patent: *Jan. 6, 2004

(54) PASSIVE THERMAL STABILIZATION FOR AN OPTICAL MUX/DEMUX

(75) Inventor: Ping Xie, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,455

(22) Filed: Jan. 6, 2000

Related U.S. Application Data

(63) Continuation of application No. 09/473,774, filed on Dec. 29, 1999, now Pat. No. 6,373,604.
(60) Provisional application No. 60/172,741, filed on Dec. 20, 1999, provisional application No. 60/170,452, filed on Dec. 13, 1999, provisional application No. 60/168,148, filed on Nov. 29, 1999, provisional application No. 60/166,609, filed on Nov. 19, 1999, and provisional application No. 60/157,265, filed on Oct. 1, 1999.

(51) Int. Cl.[7] .......................... H04J 14/02; H04J 14/00; H04J 14/06; H04B 10/20; G02B 5/30
(52) U.S. Cl. .............................. 398/79; 398/43; 398/47; 398/65; 398/75; 398/68; 359/483; 359/494; 359/497
(58) Field of Search ................................ 359/115, 123, 359/124, 127, 484, 494, 495, 498

(56) References Cited

U.S. PATENT DOCUMENTS

| | | | |
|---|---|---|---|
| 4,094,581 A | 6/1978 | Baldwin et al. ............. 350/150 |
| 4,685,773 A | 8/1987 | Carlsen et al. ............... 350/401 |
| 4,813,761 A | 3/1989 | Davis et al. ............. 350/162.15 |
| 4,987,567 A | 1/1991 | Buhrer ........................... 370/3 |
| 5,606,439 A | 2/1997 | Wu ............................ 349/117 |
| 5,694,205 A | 12/1997 | Gualtieri et al. ............... 356/33 |
| 5,694,233 A | 12/1997 | Wu et al. .................... 359/117 |
| 5,867,291 A * | 2/1999 | Wu et al. .................... 359/124 |
| 6,005,697 A * | 12/1999 | Wu et al. .................... 359/117 |
| 6,208,444 B1 * | 3/2001 | Wong et al. ................ 359/127 |
| 6,373,604 B1 * | 4/2002 | Xie ............................ 359/124 |

* cited by examiner

Primary Examiner—Leslie Pascal
Assistant Examiner—M. R. Sedighian
(74) Attorney, Agent, or Firm—Workman Nydegger

(57) ABSTRACT

A method and apparatus for multiplexing/de-multiplexing optical signals is disclosed. The method and apparatus are applicable to a range of optical multiplexing techniques including, but not limited to: wavelength division multiplexing (WDM), dense wavelength division multiplexing (DWDM) and frequency division multiple accessing (FDMA). The disclosed devices do not require active components. The disclosed devices may be implemented with fiber or fiberless optical communication systems including telecommunications systems. The devices may be used on their own or as part of a larger system such as a multi-stage mux/demux, an optical switch, or router. Additionally, the devices are passively thermally stabilized with the result that their tuning is substantially invariant across a wide temperature range.

The optical device includes a linear polarizer, at least one wave plate and a beam displacer/combiner. The wave plate optically couples to the linear polarizer and rotates both odd and even channel components of an optical beam between a linear and an orthogonal relationship depending on the propagation direction. The wave plate includes a primary and a compensating birefringent element with respective first and second lengths and first and second indices of refraction. The first and second lengths and the first and second indices of refraction together determinative both of a free spectral range for the at least one wave plate corresponding to a spacing between adjacent gridlines of the selected wavelength grid, and of a combined optical pathlength difference for the wave plate substantially invariant with temperature.

32 Claims, 14 Drawing Sheets

TOP VIEW

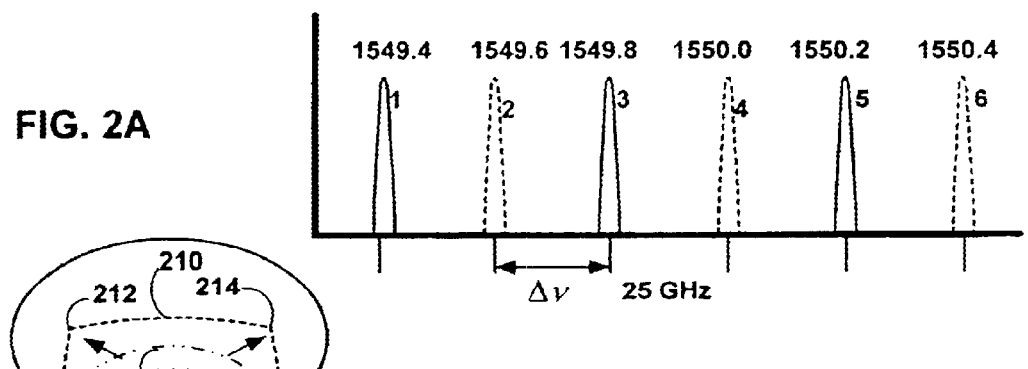
FIG. 2A
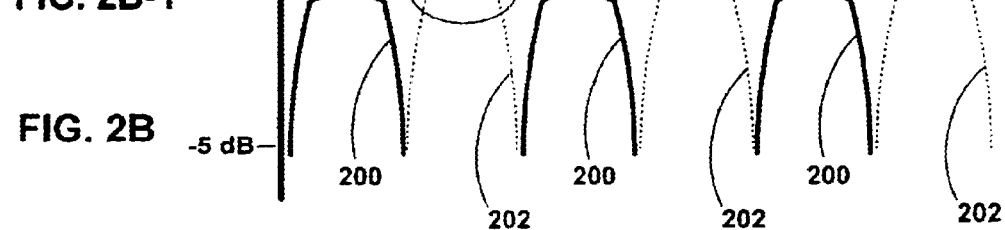
FIG. 2B-1
FIG. 2B
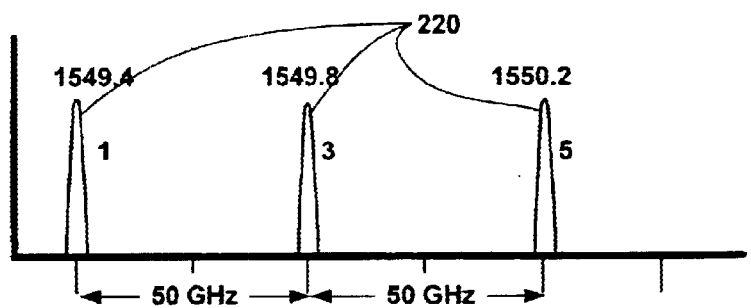
FIG. 2C
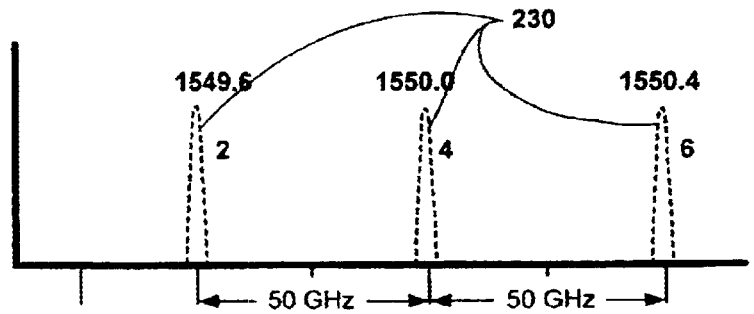
FIG. 2D

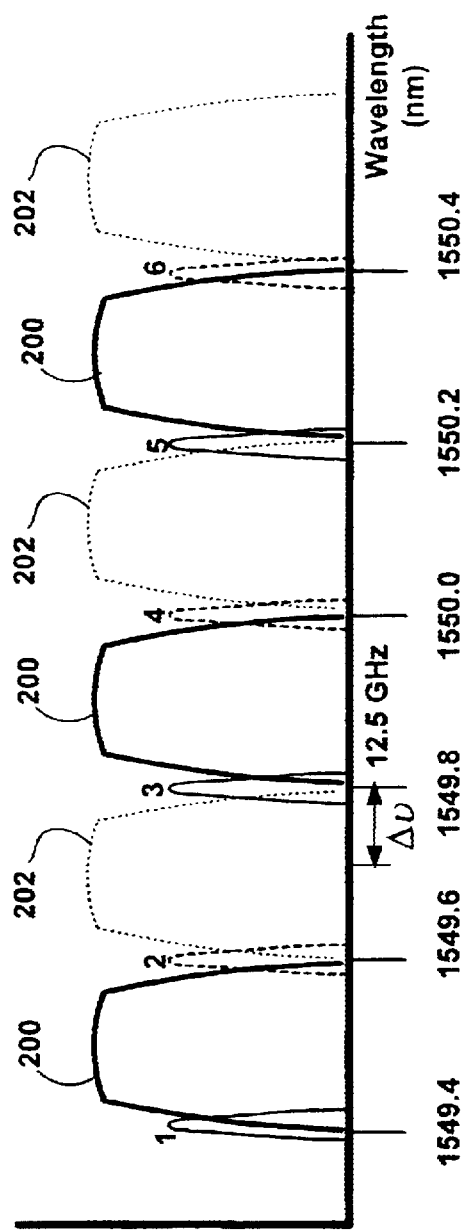
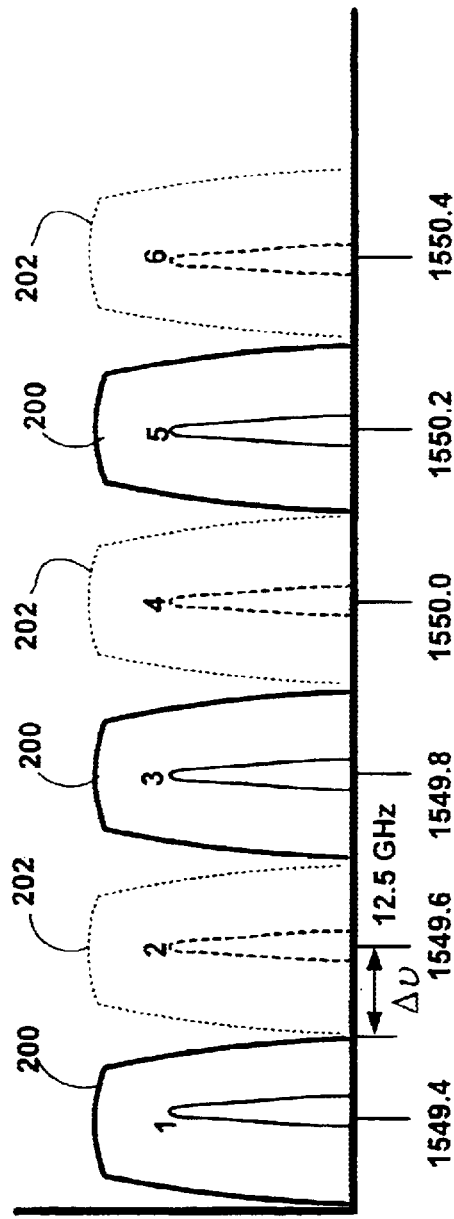
FIG. 2E
FIG. 2F

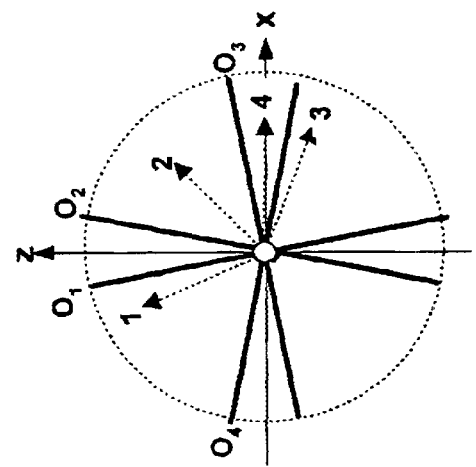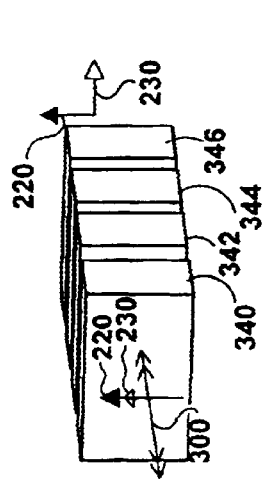
FIG. 3K  FIG. 3L
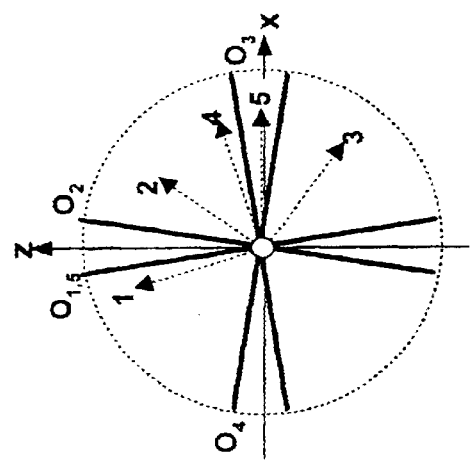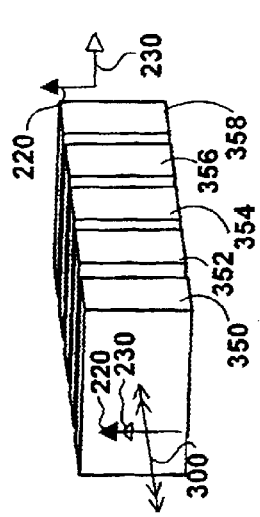
FIG. 3I  FIG. 3J
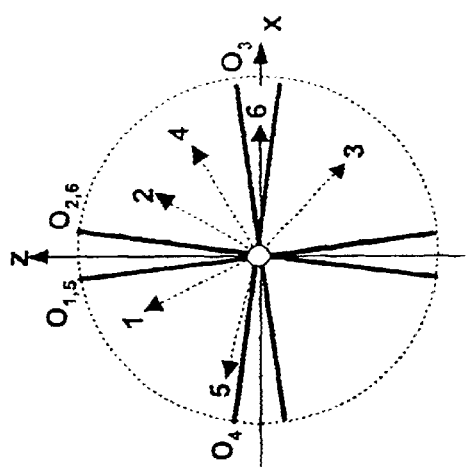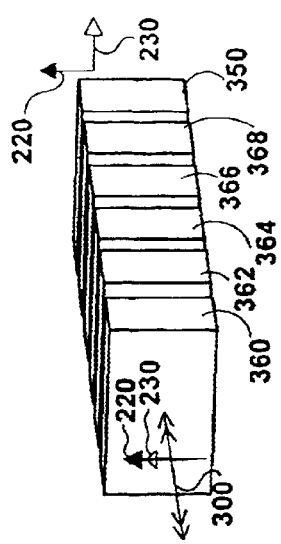
FIG. 3G  FIG. 3H

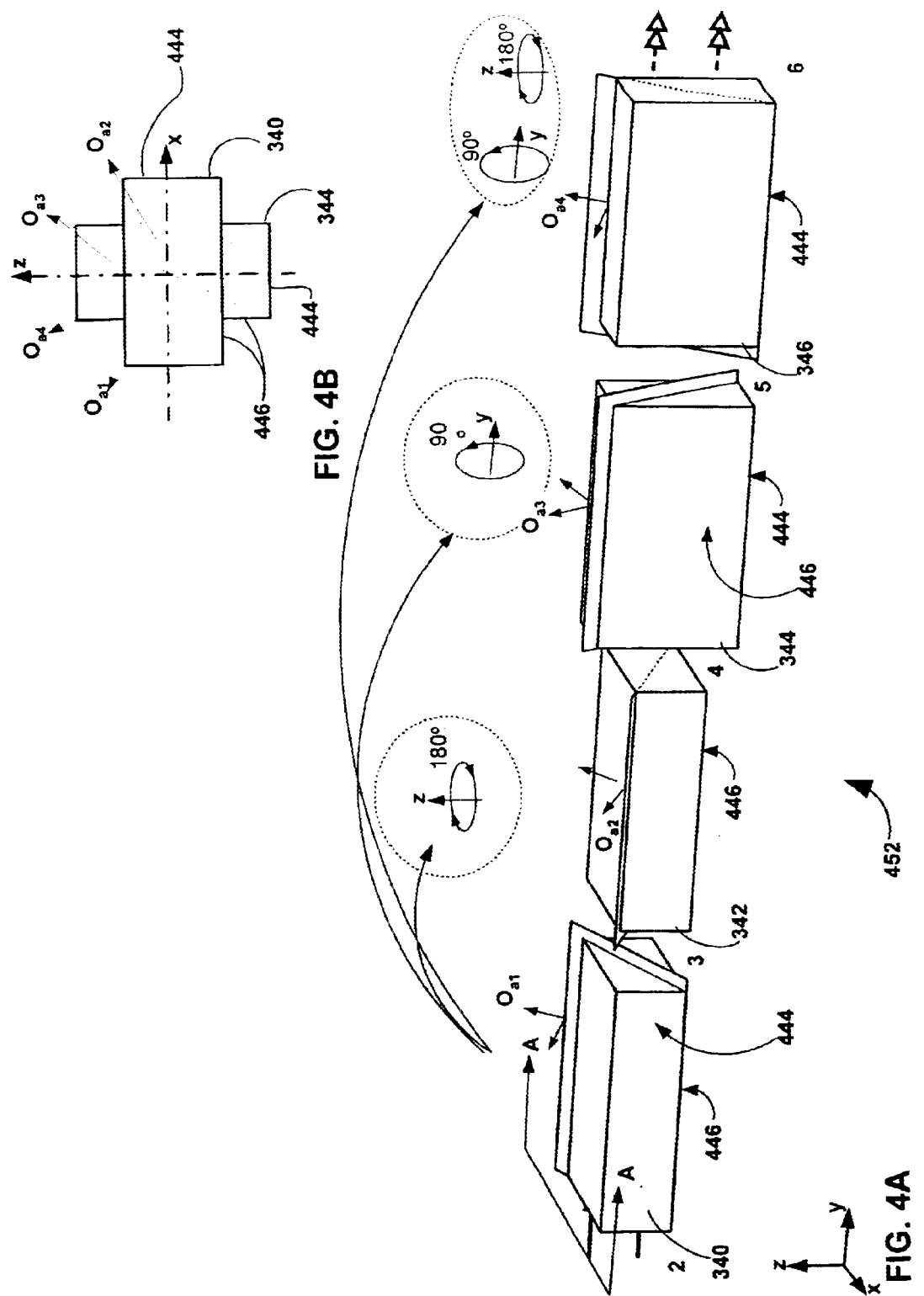

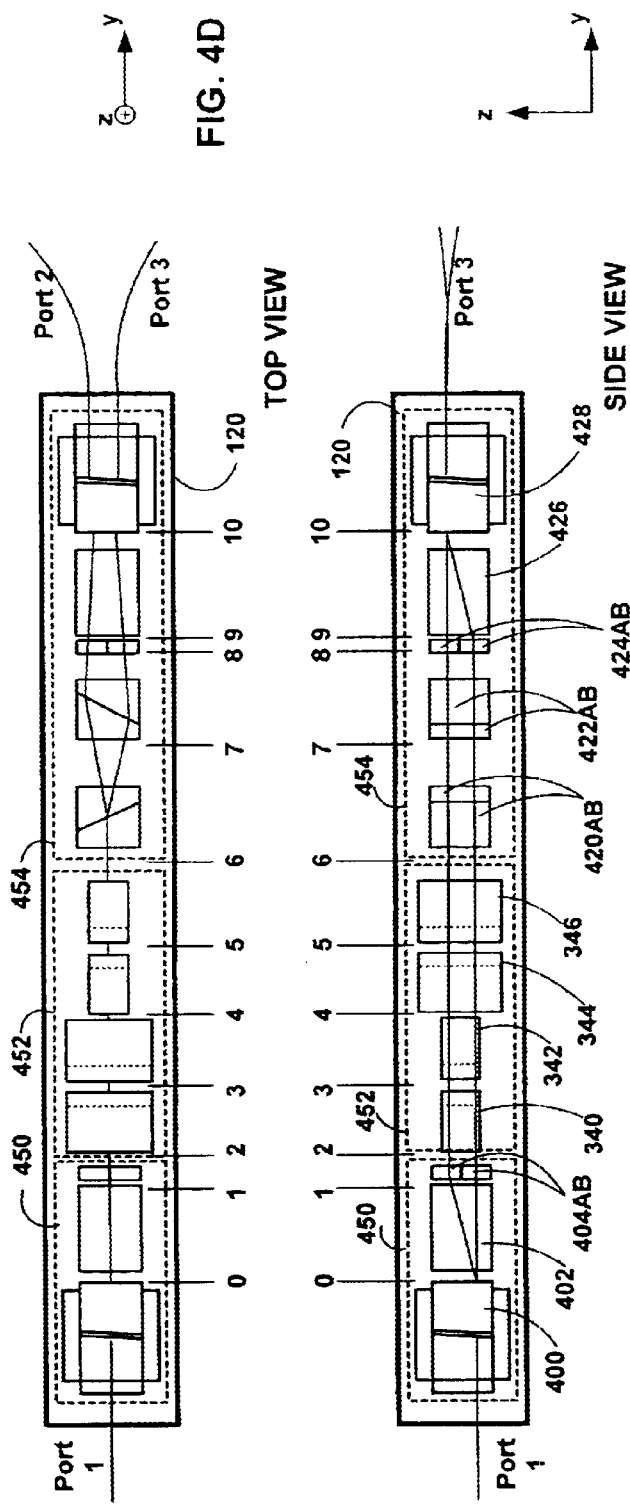
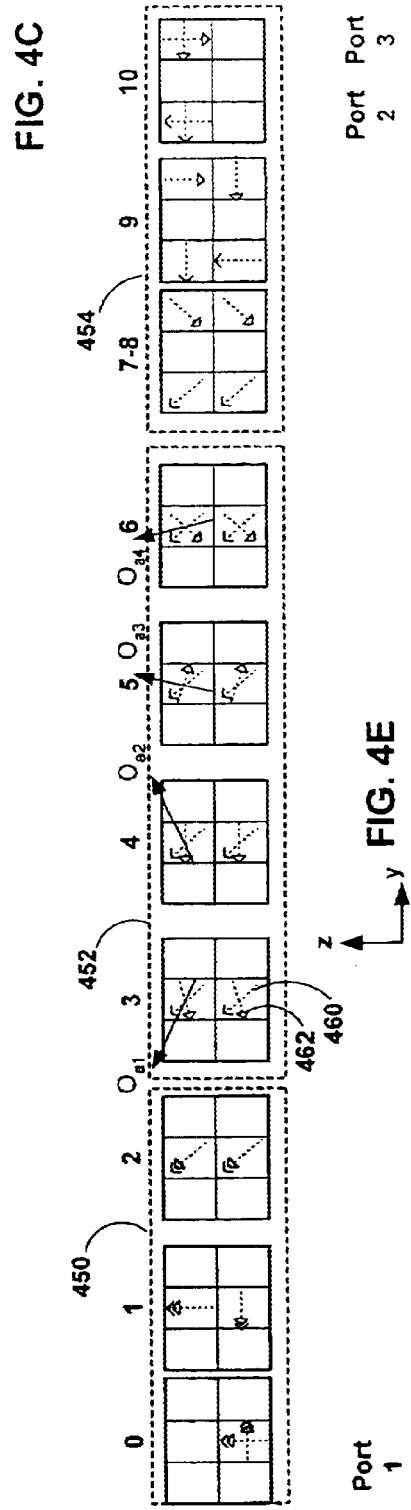

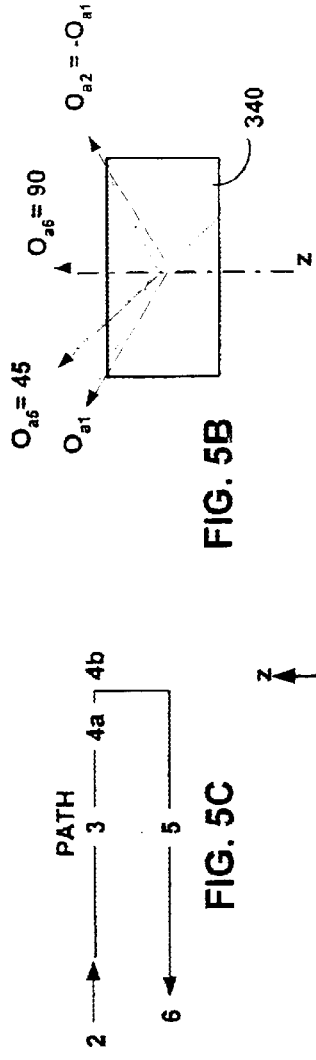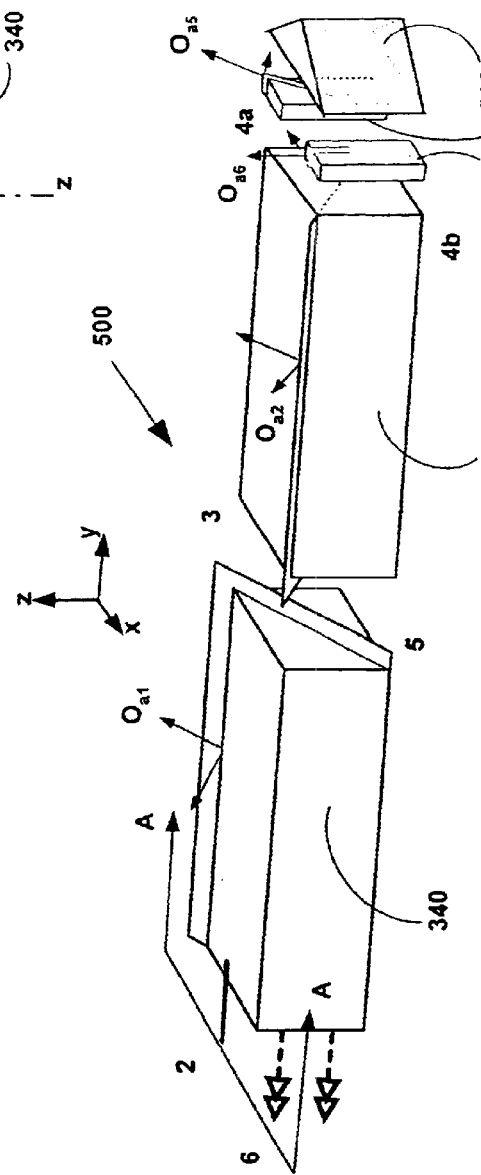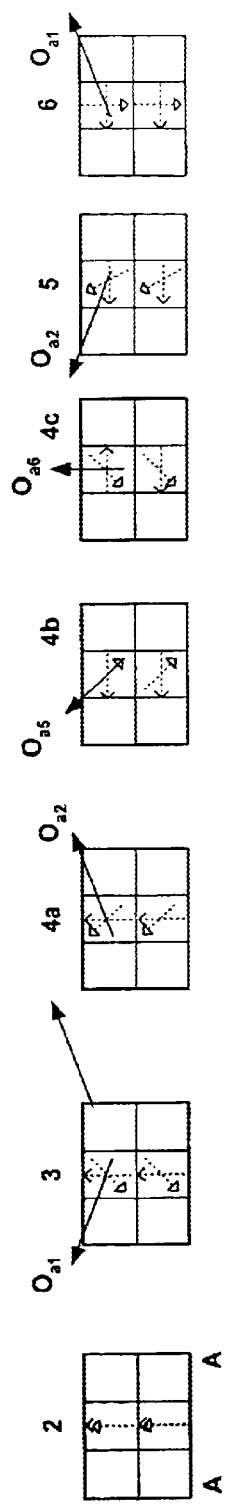
FIG. 5B
FIG. 5C
FIG. 5A
FIG. 5D

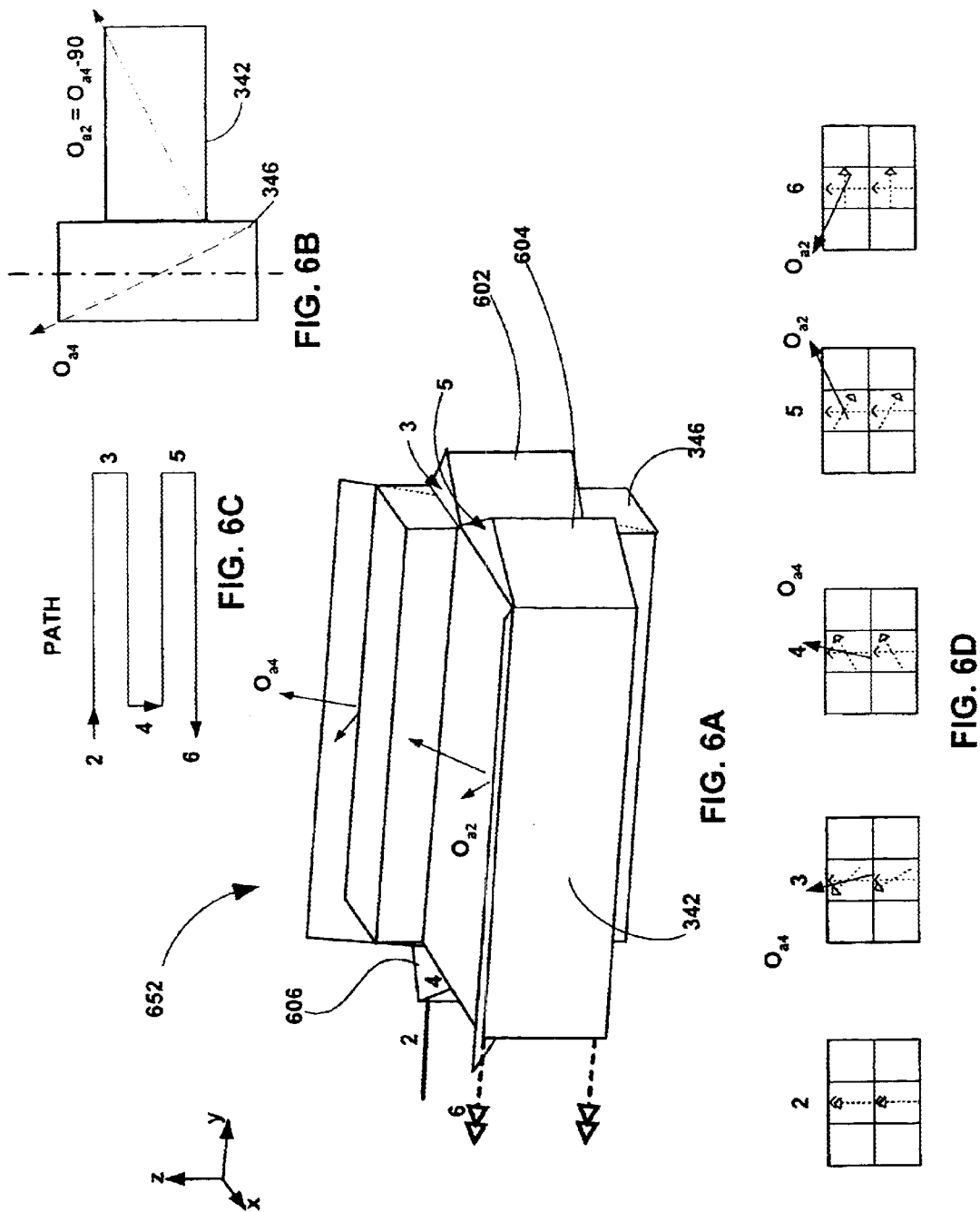

TOP VIEW

2 Stage INTERLEAVER

TOP VIEW

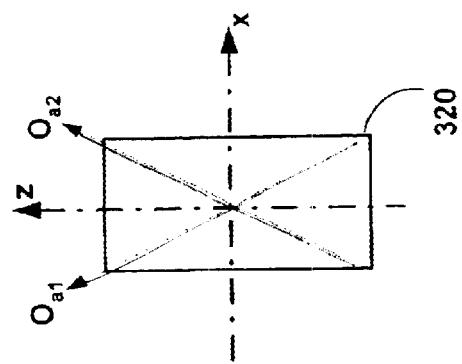
FIG. 8B
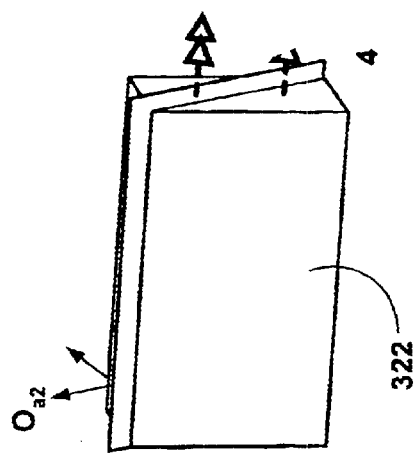
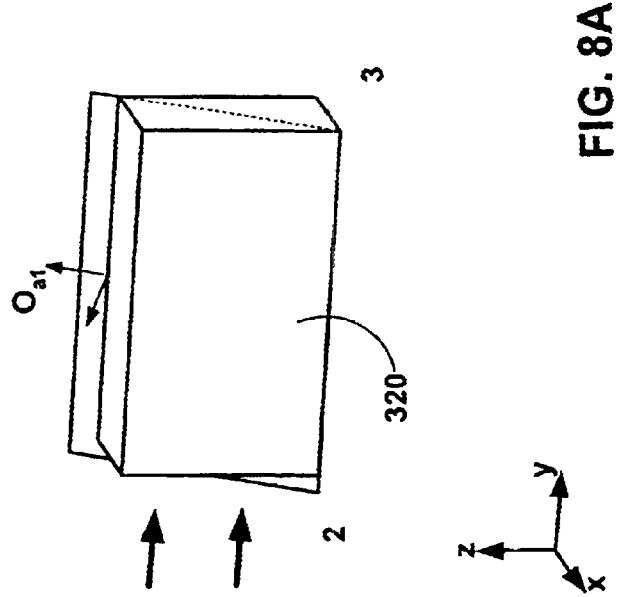
FIG. 8A

PASSIVE THERMAL STABILIZATION FOR AN OPTICAL MUX/DEMUX

REFERENCES TO RELATED APPLICATIONS

This application claims benefit of priority of U.S. Provisional Application No. 60/157,265, filed Oct. 1, 1999, entitled "OPTICAL MUX/DEMUX"; U.S. Provisional Application No. 60/166,609, filed Nov. 19, 1999, entitled "OPTICAL MUX/DEMUX DRAWINGS"; U.S. Provisional Application No. 60/168,148, filed Nov. 29, 1999, entitled "OPTICAL MUX/DEMUX FLATTOP"; U.S. Provisional Application No. 60/170,452, filed Dec. 13, 1999, entitled "THERMALLY INSENSITIVE POLARIZATION"; and U.S. Provisional Application No. 60/172,741, filed Dec. 20, 1999, entitled "OPTICAL MUX/DEMUX (2)"; and a con't of U.S. patent application Ser. No. 09/473,774 (now U.S. Pat. No. 6,373,604), filed Dec. 29, 1999 now U.S. Pat. No. 6,373,604, entitled "OPTICAL MUX/DEMUX" all of which are hereby incorporated by reference in their entirety.

BACKGROUND OF THE INVENTION

1. Field of Invention

The present invention generally relates to optical fiber communication networks, and more particularly to a splitting system for a multi-channel optical fiber communication network for multiplexing and/or de-multiplexing an optical signal with a plurality of individual channels and various wavelengths.

2. Description of the Related Art

The telecommunications network serving the United States and the rest of the world is presently evolving from analog to digital transmission with ever increasing bandwidth requirements. Fiber optic cable has proved to be a valuable tool, replacing copper cable in nearly every application from large trunks to subscriber distribution plants. Fiber optic cable is capable of carrying much more information than copper with lower attenuation.

The T-1 standards committee ANSI has provided a draft document, "ANSI T1.105-1988", dated Mar. 10, 1988, which sets forth specifications for rate and format of signals which are to be used in optical interfaces. The provided specifications detail the Synchronous Optical Network (SONET) standard. SONET defines a hierarchy of multiplexing levels and standard protocols which allow efficient use of the wide bandwidth of fiber optic cable, while providing a means to merge lower level DS0 and DS1 signals into a common medium. In essence, SONET established a uniform standardization transmission and signaling scheme, which provided a synchronous transmission format that is compatible with all current and anticipated signal hierarchies. Because of the nature of fiber optics, expansion of bandwidth is easily accomplished.

Currently this expansion of bandwidth is being accomplished by what is known as "wavelength division multiplexing" (WDM), in which separate subscriber/data sessions may be handled concurrently on a single optic fiber by means of modulation of each of those subscriber datastreams on different portions of the light spectrum. Therefore, WDM is the optical equivalent of frequency division multiplexing (FDM). Current implementations of WDM involve as many as 128 semiconductor lasers each lasing at a specific center frequency within the range of 1525–1575 nm. A wavelength division multiplexer (WDM) is usually a passive optical network or device. The WDM can be used to divide wavelengths (or channels) from a multi-channel optical signal or to combine various wavelengths (or channels) on respective optical paths into one multi-channel optical signal on one optical path. Each subscriber datastream is optically modulated onto the output beam of a corresponding semiconductor laser. The modulated information from each of the semiconductor lasers is combined onto a single optic fiber for transmission.

There are three classes of WDM's: coarse, intermediate, and dense. Coarse WDM's are configured for dividing and combining two wavelengths (or channels) that are spaced relatively far apart, e.g., 1310/1550 nanometers. The WDM is used to separate wavelength bands (with 100 nm, i.e., 13 terahertz bandwidth) centered around 1310 nm and 1550 nm. Intermediate WDM's are configured for dividing and combining two or three wavelengths (or channels) that are spaced closer than those of the coarse WDM's, e.g., a 1540/1560 nm WDM used to put to channels approximately 20 nm, i.e. 2.5 terahertz, apart in the 1550 nm wavelength bands. Currently, a third category, dense WDM's (also referred to as DWDM's) are configured for dividing and combining 4, 8, 16, 32, 64, 128 or more wavelengths (or channels) that are very closely spaced. The spacing between channels is constantly being reduced as the resolution and signal separation capabilities of multiplexers and de-multiplexers are improved. Current International Telecommunications Union (ITU) specifications call for channel separations of approximately 0.4 nm, i.e., 50 GigaHertz. At this separation, as many as 128 channels may be carried by a single fiber in a bandwidth range within the same capacity of an erbium doped fiber amplifier (EDFA).

Because of the close spacing between the channels in a DWDM, it is desirable to design a DWDM with flat pass bands in order to increase the error tolerance. This is primarily because the center wavelength of a pass band slips with temperature, usually on the order of about 0.011 nm, i.e., 1.4 GigaHertz per degree centigrade. Further, the cascading of the DWDM stages causes the pass bands to become narrower and each DWDM down the chain. Therefore, the larger the pass bands the greater the shift tolerance of the channel.

Further, it is desirable to design a DWDM with low loss to leave more room for loss in other components in network. For example, if losses are reduced, the distance the fiber reaches, i.e. the span, can be longer. As another example, if the power of the transmitting lasers is allowed to be reduced, then inexpensive lasers can be used.

Various devices, such as multi-stage band and comb splitters, have been proposed to fill these new demanding requirements and none are fully satisfactory.

In a multi-stage band splitter, the first stage makes a coarse split of two wavelength ranges, and subsequent stages make finer and finer splits of sub-bands within each of the wavelength ranges. In this scheme, the WDM's of the subsequent stages are largest in quantity and the most expensive to fabricate because they have the smallest channel spacing.

In a multi-stage comb splitter, the first de-multiplexing stage filters out two interlaced periodic sets of relatively narrow band passes and the subsequent stages employ wider band pass periodic filters until the individual channels are de-multiplexed.

In either case, noise and inter-channel interference are limiting factors in the handling of increasingly narrow band pass requirements. Multi-layer thin-film filters can be used to construct optical filters in bulk optics, but they are undesirable because of an increase in the number of layers, precision of manufacture and expense associated with increasingly narrow band pass requirements. Additionally, thin-film optical filters cannot be readily integrated because of difficulties in coupling to and from fibers. Mach-Zehnder interferometers have been widely employed, but they have a sinusoidal response, giving rise to strongly wavelength dependent transmission and a narrow rejection band. Other designs have encountered a variety of practical problems. Accordingly, there is a need for the new type of optical multiplexer/de-multiplexer which can be easily fabricated, with narrower band pass capabilities.

SUMMARY OF THE INVENTION

A method and apparatus for multiplexing/de-multiplexing optical signals is disclosed. The method and apparatus are applicable to a range of optical multiplexing techniques including, but not limited to: wavelength division multiplexing (WDM), dense wavelength division multiplexing (DWDM) and frequency division multiple accessing (FDMA). The disclosed devices do not require active components. The disclosed devices may be implemented with fiber or fiberless optical communications systems including telecommunication systems. The devices may be used on their own or as part of a larger system such as a multi-stage mux/demux, an optical switch or router. The devices exhibit a small form. They may be precisely tuned to a specific wavelength grid. Additionally, the devices are passively thermally stabilized with the result that their tuning is substantially invariant across a wide temperature range.

In an embodiment of the invention, an optical device for operating on optical signals between a first port communicating odd channels and even channels and a second port communicating the odd channels together with a third port communicating the even channels is disclosed. Adjacent orders of the odd and even channels are evenly spaced apart and each centered on a corresponding gridline of a selected wavelength grid. The optical device includes a linear polarizer, at least one wave plate, and a beam displacer/combiner. The linear polarizer couples to the first port for linearly polarizing optical signals. The at least one wave plate include a first and a second I/O interface. The at least one wave plate optically couples at a first I/O interface to the linear polarizer. The at least one wave plate rotates both odd and even channel components of an optical beam between a linear and an orthogonal relationship depending on the propagation direction. The at least one wave plate includes a primary and a compensating birefringent element. The primary birefringent element with a selected first length and first indices of refraction. The compensating birefringent element with a selected second length and a second indices of refraction distinct from the first indices of refraction. The first length, the second length, the first indices of refraction and the second indices of refraction together determinative both of a free spectral range for the at least one wave plate corresponding to a spacing between adjacent gridlines of the selected wavelength grid, and determinative as well as of a combined optical pathlength difference for the wave plate substantially invariant with respect to temperature. The beam displacer/combiner optically couples the second I/O interface of the plurality of wave plates with both the second port and the third port. The beam displacer/combiner displaces and combines orthogonally polarized odd and even channel components of an optical beam depending on propagation direction.

In an alternate embodiment of the invention, a method for splitting/combining odd and even channels of an optical beam between a first port communicating odd channels and even channels and a second port communicating the odd channels together with a third port communicating the even channels is disclosed. Adjacent orders of the odd and even channels are evenly spaced apart and each centered on a corresponding gridline of a selected wavelength grid. The method for splitting/combining comprises;

linearly polarizing the optical beam at the first port;

relatively retarding an e-ray and an o-ray component of the optical beam by a primary amount and a compensating amount and a sum of the primary amount and the compensating amount substantially invariant with respect to temperature, and the sum corresponding to an integer multiple of $2\pi$ of a one of the odd channels and the even channels and to odd integer multiples of $\pi$ for an other of the odd channels and the even channels, both at a free spectral range corresponding to the spacing between gridlines of the selected wavelength grid, to rotate odd and even channel components of the optical beam between a linear and an orthogonal relationship depending on the propagation direction; and displacing and combining orthogonally polarized odd and even channel components of an optical beam depending on a propagation direction.

In an embodiment of the invention, an optical device for operating on optical signals between a first port communicating odd channels and even channels and a second port communicating the odd channels together with a third port communicating the even channels is disclosed. Adjacent orders of the odd and even channels are evenly spaced apart and each centered on a corresponding gridline of a selected wavelength grid. The optical device includes at least one wave plate. The at least one wave plate include a first and a second I/O interface. The at least one wave plate rotates both odd and even channel components of an optical beam between a linear and an orthogonal relationship depending on the propagation direction. The at least one wave plate includes a primary and a compensating birefringent element. The primary birefringent element with a selected first length and first indices of refraction. The compensating birefringent element with a selected second length and a second indices of refraction distinct from the first indices of refraction. The first length, the second length, the first indices of refraction and the second indices of refraction together determinative both of a free spectral range for the at least one wave plate corresponding to a spacing between adjacent gridlines of the selected wavelength grid, and determinative as well as of a combined optical pathlength difference for the wave plate substantially invariant with respect to temperature.

In an embodiment of the invention, an optical device for operating on optical signals between a first port communicating odd channels and even channels and a second port communicating the odd channels together with a third port communicating the even channels is disclosed. Adjacent orders of the odd and even channels are evenly spaced apart and each centered on a corresponding gridline of a selected wavelength grid. The optical device includes a linear polarizer and a plurality of crystals. The linear polarizer couples to the first port for linearly polarizing the optical signals. The plurality of crystals oriented to intersect a path of an optical beam. The plurality of crystals include a first and a second I/O interface. The plurality of crystals couple at a first I/O interface to the linear polarizer. The plurality of crystals rotate both odd and even channel components of an optical beam between a linear and an orthogonal relationship depending on the propagation direction and substantially independent of a polarization orientation of the linearly polarized optical signals at the first I/O interface.

BRIEF DESCRIPTION OF THE DRAWINGS

These and other features and advantages of the present invention will become more apparent to those skilled in the art from the following detailed description in conjunction with the appended drawings in which:

FIGS. 2A–F are signal diagrams showing the passive signal processing accomplished by the periodic optical filters of the current invention.

FIGS. 4AB show an isometric side view and an end view of a periodic optical filter fabricated from a single crystal in four discrete orthogonal orientations.

FIGS. 4CD show top and side elevation views of the periodic optical filter shown in FIGS. 4AB with interfaces to optical ports for multiplexing or de-multiplexing optical signals.

FIG. 4E shows polarization diagrams of light rays at various stages of the mux/demux shown in FIGS. 4CD.

FIGS. 5AB are isometric side and end views of a periodic filter which uses a 2 crystal stack and a folded light path to achieve optical filtration equivalent to that associated with a 4 crystal stack.

FIGS. 5CD are ray trace and polarization diagrams of light rays at various stages of the periodic filter shown in FIGS. 5AB.

FIGS. 6AB are isometric side and end views of a periodic filter which uses an alternate side-by-side embodiment of the 2 crystal stack and folded light path shown in FIGS. 5AB.

FIGS. 6CD are ray trace and polarization diagrams of light rays at various stages of the periodic filter shown in FIGS. 6AB.

DETAILED DESCRIPTION OF THE EMBODIMENTS

A method and apparatus for multiplexing/de-multiplexing optical signals is disclosed. The method and apparatus are applicable to a range of optical multiplexing techniques including, but not limited to: wavelength division multiplexing (WDM), dense wavelength division multiplexing (DWDM), and frequency division multiple accessing (FDMA). The disclosed devices do not require active components. The disclosed devices may be implemented with fiber or fiberless optical communication systems including telecommunication systems. The devices may be used on their own or as part of a larger system, such as a multi-stage mux/demux, an optical switch, or router. The devices exhibit a small form. They may be precisely tuned to a specific wavelength grid.

Figure 1:
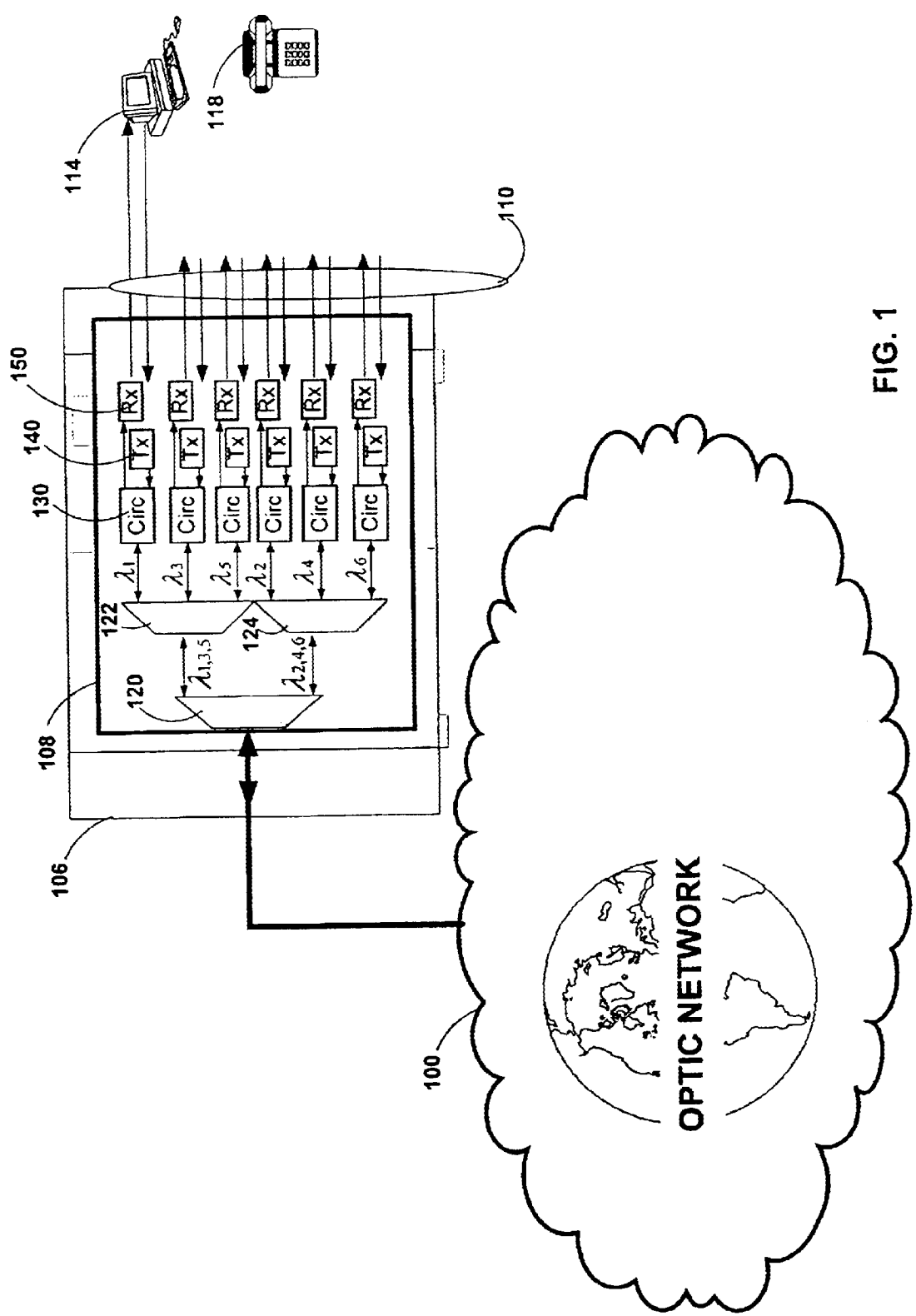
FIG. 1 shows an embodiment of the invention in which an optical network is coupled to a plurality of data and voice subscriber lines by an optical multiplexer/de-multiplexer utilizing periodic optical filters, according to an embodiment of the current invention.

FIG. 1 shows an embodiment of the invention in which an optical network is coupled to a plurality of data and voice subscriber lines by an optical multiplexer/de-multiplexer utilizing periodic optical filters, according to an embodiment of the current invention. An optical network 100, a central office or remote terminal 106, a data terminal 114 and voice terminal 118 are shown. Voice/Data communications on the optical network may be implemented in accordance with the Synchronous Optical Network (SONET) or other standard. The modulated data may be carried on a number of channels according to some multiple access protocols, singly or in combination, including, but not limited to: wavelength division multiplexing (WDM), dense wavelength division multiplexing (DWDM), frequency division multiple access (FDMA), etc. Currently this expansion of bandwidth is being accomplished by what is known as "wavelength division multiplexing" (WDM), in which separate subscriber/data sessions may be handled concurrently on a single optic fiber by means of modulation of each of those subscriber datastreams on different portions of the light spectrum. The precise center frequencies of each channel are specified by standard setting organizations such as the International Telecommunications Union (ITU). These center frequencies are set forth as part of a wavelength grid which defines the center frequencies and spacing between channels.

At each node in the network, e.g., central office or remote terminal 106, optical transceiver mounted on fiber line cards, e.g., card 108 is provided. Each line card includes a multi-stage multiplexer/de-multiplexer 120, 122–124, a circulator bank 130, a transmitter bank 140, and a receiver bank 150. The multiplexer/de-multiplexer is a passive optical device which divides wavelengths (or channels) from a multi-channel optical signal, or combines various wavelengths (or channels) on respective optical paths into one multi-channel optical signal depending on the propagation direction of the light.

In the receive mode, the first stage mux/demux 120 operates as a de-multiplexer, separating the odd from even channels. The odd and even channels are passed to second stage mux/demux 122–124, respectively. The second stage mux/demux may be implemented at a broader bandwidth than is possible with a first stage, since the channels separation has been increased. Each individual channel is then passed on via a corresponding circulator within circulator bank 130 to a corresponding receiver in receiver bank 150. Each receiver includes a narrow band pass photodetector, framer and decoders. Switches (not shown) couple the receiver over the corresponding one of subscriber lines 110 to a voice or data terminal 118, 114, respectively.

In the transmit mode, each line card transmitter bank 140 includes a bank of lasers, e.g., 128 lasers radiating light at one of the selected center frequencies/channels of the telecommunications grid. A framer permits SONET framing, pointer generation and scrambling for transmission of data from the bank of 128 or more lasers and associated drivers, with each laser radiating at a different wavelength/channel within the range of 1525–1575 nm, as specified by the telecommunications grid. Each subscriber datastream is optically modulated onto the output beam of a corresponding semiconductor laser. The modulated information from each of the semiconductor lasers is passed via a corresponding circulator into the second stage multiplexers 122–124, the outputs of which pass to the first stage multiplexer 120 where they are interlaced as odd and even channels onto a single optic fiber for transmission.

The operation of the line card in the embodiment shown is duplex, meaning that bi-directional communications are possible. Thus, the same device operates as a multiplexer and de-multiplexer.

The optical mux/demux may be implemented as part of a larger telecommunications system such as an optical switch or router, without departing from the scope of the claimed invention. In a router embodiment one or more optical switches would be sandwiched between the opposing mux/demux.

FIGS. 2A–F are signal diagrams showing the passive signal processing accomplished by the periodic optical filters of the current invention.

FIG. 2A is a graph of amplitude vs. frequency showing the envelope associated with six narrowly spaced, i.e., 25 GHz or 0.2 nm WDM channels. The odd channels 1, 3 and 5 are shown in solid line. The even channels 2, 4 and 6 are shown in dashed line. Superimposed over each channel is the center wavelength in nanometers.

FIG. 2B is a graph of periodic filter response, in terms of transmission, in decibels vs. frequency. An odd set 200 and an even set 202 of periodic filter transmission characteristics are shown in solid and dashed line, respectively. The optical elements from which these characteristics may be attained are shown in the following figures and accompanying text. The transmission of the filters is periodic with pass bands with a periodicity substantially similar to that of the odd or even channels shown in FIG. 2A, i.e., 50 GHz. In enlarged view, the peak transmission characteristics of the filters are shown. A representative even pass band peak is shown with a flat top 210 with distinct edges 212–214 superimposed over a sinusoidal transmission curve. A filter transmission with periodic flat tops is preferred because each channel is subject to shifting around the center frequency and a flat top avoids attenuation of a channel subject to such shifting. Shifting may be caused by any one of a number of factors including temperature, stress, etc.

FIGS. 2CD are graphs which show signal profiles after filtration by the periodic filters of the current invention. The original odd and even channel sets shown in FIG. 2A are separated into odd channels 220 (See FIG. 2C) and even channels 230 (See FIG. 2D). In a multi-stage demux this process of periodic filtration can be applied to subsequent stages until individual channels are obtained. Alternately, de-multiplexing can be achieved by other forms of filtration in subsequent stages since the channel spacing has been doubled from 25 to greater than 50 Ghz.

Figure 3E:
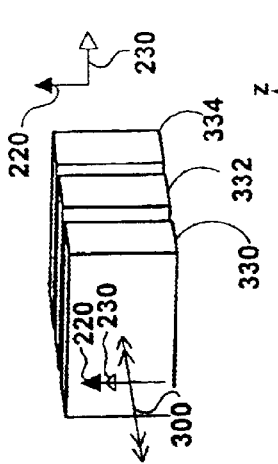
FIGS. 3A, C, E, G, I and K are graphs showing the optical axes and polarization vectors associated with periodic optical filters fabricated from 1, 2, 3, 4, 5 and 6 birefringent crystal stacks, respectively.
FIGS. 3B, D, F, H, J and L are isometric side views of periodic optical filters with 1, 2, 3, 4, 5 and 6 birefringent crystal stacks, respectively.
FIG. 3M is an enlarged side elevation view of the 4 crystal stack shown in FIG. 3H, showing the tuning of each crystal's center frequency to a telecommunications grid such as is shown in FIGS. 2E–F.
Figure 3C:
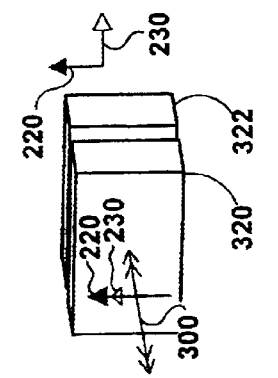
Figure 3A:
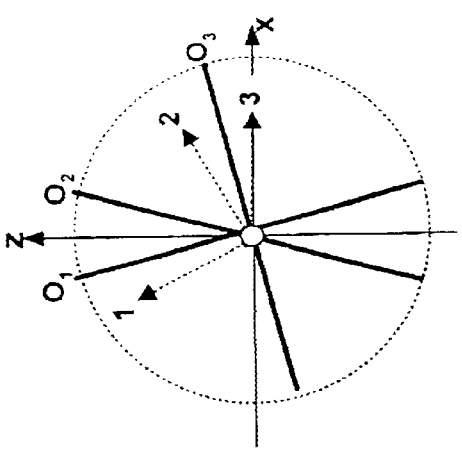
Figure 3F:
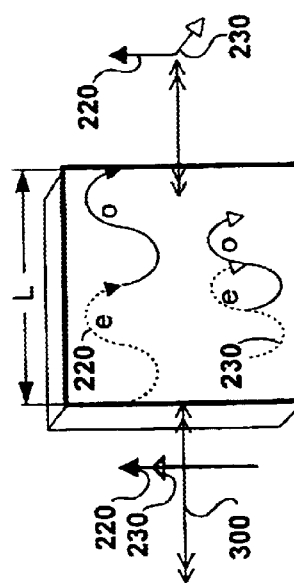
Figure 3D:
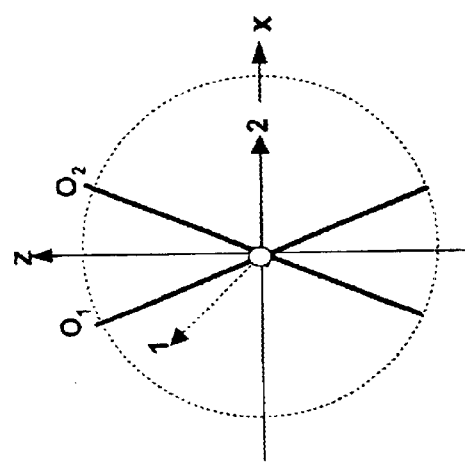
Figure 3B:
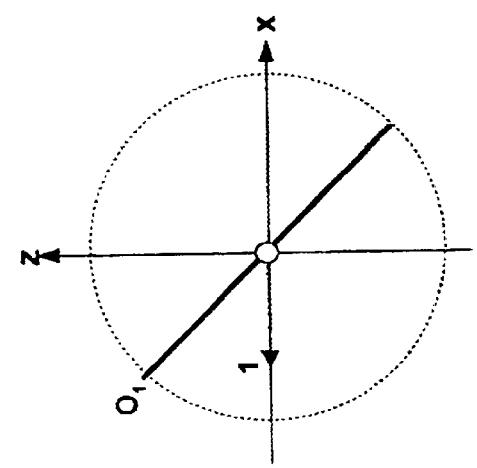
Figure 3M:
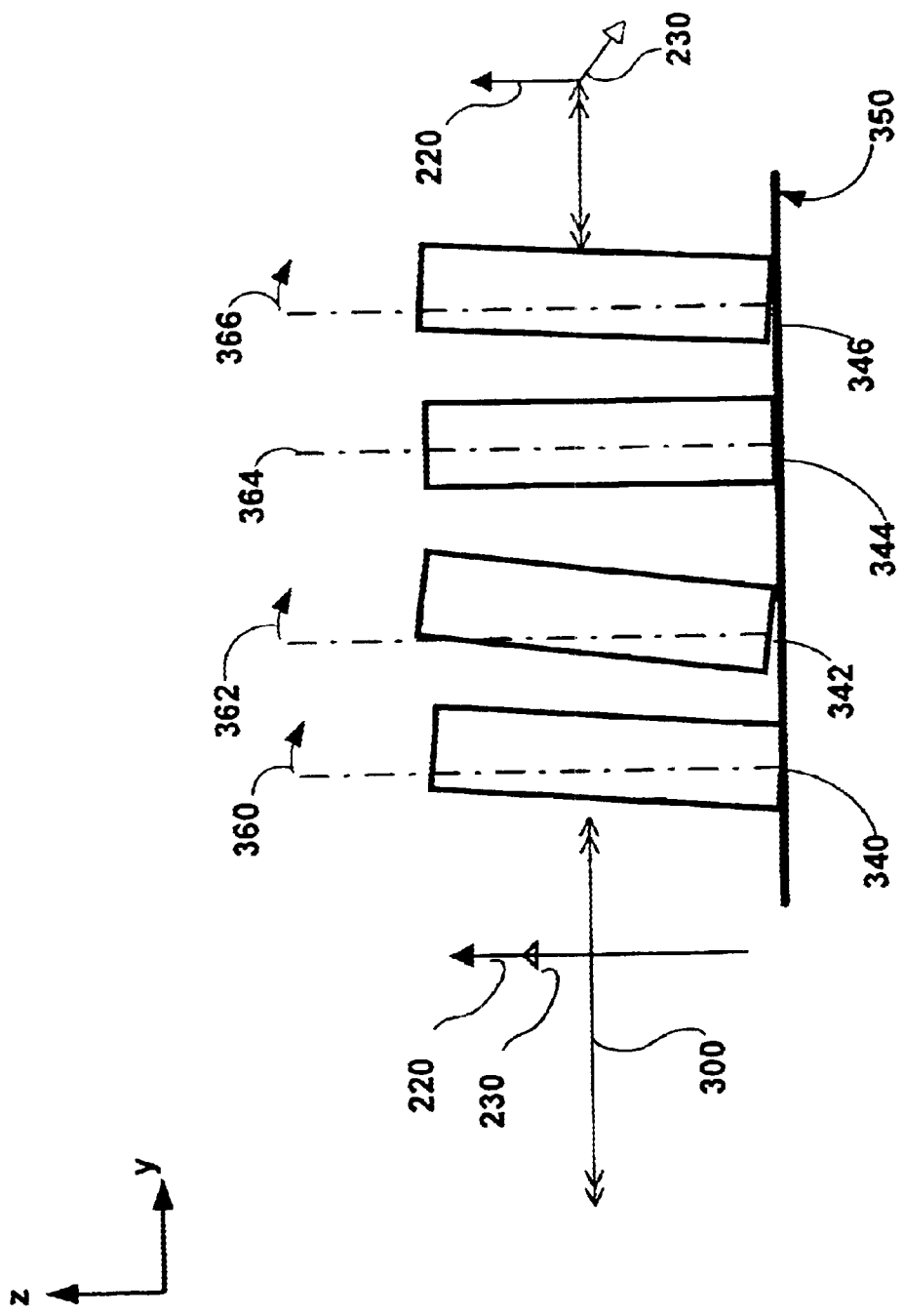

In addition to providing periodic flat top filtration, the periodic filters of the current invention are also easily tuned, as will be shown in FIG. 3M. An un-tuned and tuned periodic filter response is shown in FIGS. 2EF, respectively. Both figures show both odd and even channels superimposed on periodic filter transmission characteristics. In FIG. 2E, the periodic filter is out of alignment with the telecommunications grid. In this instance, the filters uniformly block all channels. FIG. 2F shows the phase relationship between the periodic filter transmission and the channels shifted, as required, so that each channel, odd/even, is centered under a pass band peak.

Waveplates

The periodic filters of the current invention may be fabricated from wave plates. When the optic axis of a birefringent crystal is arranged to be substantially parallel with the entrance/exit surfaces of a light beam, the crystal operates as a retarder or wave plate. Light passing through the crystal is separated into ordinary and extraordinary rays, each of which experiences a different index of refraction, $n_o$ and $n_e$, respectively. Since the index of refraction of a material identifies the ratio of the speed of light in a vacuum to that of light in a vacuum, the e- and o-rays are said to travel along fast/slow paths. The relative optical path length difference between the e-wave and the o-wave is expressed in the following Equation 1 as a product of the length L of the crystal and the difference between the indices of refraction for the e- and o-rays.

$$\Lambda = L(|n_o - n_e|) \qquad \text{Equation I}$$

The difference in optical path length results in an absolute phase shift between the e-wave and o-wave components of an incident light beam which increases across the length of the crystal. The longer the wavelength of light entering the crystal, the greater the thickness of the crystal required to achieve the same overall phase shift.

Half

Where the relative optical path length difference corresponds to half that of the incident wavelength or odd integer multiples thereof, the retarder is classified as a half wave plate, as expressed in the following Equation II:

$$L(|n_o - n_e|) = \frac{(2m+1)\lambda_o}{2} \qquad \text{Equation II}$$

where m is an integer corresponding to the order of the wavelength $\lambda_o$. Where such a relationship exists, linearly polarized light which enters the plate emerges from the plate with a relative phase retardation of ½λ and a shift in the direction of the polarization vector, as shown in the following diagram.

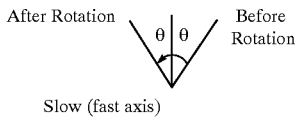

Full

Where the optical path length corresponds to that of the incident wavelength or integer multiples thereof, the retarder is classified as a full wave plate, as expressed in the following Equation III.

$$L(|n_o - n_e|) = m\lambda_o \qquad \text{Equation III}$$

No rotation of the polarization vector occurs for wavelengths of light at which the plate operates as a full wave plate.

Now a wave plate has a free spectral range (FSR). The free spectral range correlates with the minimum resolvable bandwidth of the wave plate. FSR also represents the channel spacing between adjacent odd and even channels. FSR is defined in the following Equation IV.

$$FSRv = \frac{1}{2} \times \frac{c}{L(|n_o - n_e|)} \qquad \text{Equation IV}$$

where c is the speed of light in a vacuum. As either the length or the difference in the indices of refraction of the e- and o-rays for a crystal increases, its FSR decreases. If the FSR of the one or more wave plates are set equal to the channel separation between adjacent channels, then odd and even channels can be separated by passing them through such a wave plate or set of wave plates. Each wave plate in the stack will operate as a full wave plate to one of the odd or even channels, and a half wave plate to the other. That set of channels for which the wave plates are half wave plates will exhibit a shift in polarization vector during passage through the wave plate stack. When that shift in polarization vectors of odd and even channels approaches 90 degrees, the separation will be at a maximum.

Where the crystal is Ytrium Vandanate YVO4; No=1.9447 and ne=2.1486. Assuming a channel spacing, such as that shown in FIG. 2A of 25 GigaHertz or 0.2 nm, the required length of the crystal would be 28.6 mm. The following table shows the indices of refraction for a range of birefringent materials.

TABLE I

| 1550 nm | YVO$_4$ | LiNbO$_3$ | KTP | a-BBO | Calcite | Crystal Quartz | Rutile |
|---|---|---|---|---|---|---|---|
| No | 1.9447 | 2.21283 | Nx, 1.72949<br>Ny, 1.73698 | 1064 nm<br>1.65790 | 1.63361 | 1.52781 | 2.45318 |
| Ne | 2.1486 | 2.1374 | Nz, 1.81584 | 1.58462 | 1.47722 | 1.53630 | 2.7093 |

FIGS. 3A, C, E, G, I and K are graphs showing the optical axes and polarization vectors associated with periodic optical filters fabricated from 1, 2, 3, 4, 5 and 6 birefringent crystal stacks shown in isometric views in FIGS. 3B, D, F, H, J and L, respectively. The following Table II shows for each stack the optical axis Oa of each crystal in relation to the initial polarization vector IPv of the odd and even channels 220–230 which are multiplexed on the linearly polarized optical beam 300 which strikes the first crystal 340 of the stack. Additionally, the polarization vector Pv is shown in any successive crystals in the stack is shown. A single crystal 310 is shown in FIG. 3B. Two crystals 320–322 are shown in FIG. 3D. Three crystals 330–334 are shown in FIG. 3F. Four crystals 340–346 are shown in FIG. 3H. Five crystals 350–358 are shown in FIG. 3J. Six crystals 360–368 are shown in FIG. 3L. The vector Pv is for whichever of the odd or even channel sets experiences each crystal in the stack as a half wave plate is shown. The polarization vector for the other of the channel sets which experiences the stack as a series of full wave plates is not shown, since for that channel set, the initial polarization vector is not rotated as it passes through the stack. Each polarization vector and optical axis is labeled with a subscript indicating the crystal with which it is associated. Note that even where the number of crystals in the stack exceeds four, e.g. FIGS. 3I–L only four optical axis orientations are required to orthogonalize the odd and even channels. This reduces the complexity associated with mounting the crystals with respect to one another and within a frame or housing.

$$\Phi_n = (-1)^n \left[ \frac{\pi}{4} \times \left\{ \left( n + \frac{1 + 3 \times ((-1)^n)}{2} \right) - \frac{2i+1}{N} \right\} \right] \quad \text{Equation V}$$

Where $\Phi_1$ is the angular orientation of the optical axis of the first crystal in the stack with respect to the vertical, "z" axis. Where N is the total number of crystals in the stack. Where i is an integer including zero. Where n is the crystal number in the stack with n=1 corresponding to the first crystal in the stack and n=N corresponding to the last crystal in the stack. For the optical axis an orientation angle $\Phi$ is equivalent to $-(180-\Phi)$. Thus, an orientation of 11.250° is equivalent to −168.75°.

The output polarization angle θn of the channel(s) for which the crystal acts as a half wave plate may be expressed as a function of the optical axis orientation of the $n_{th}$ crystal $\Phi$n and the output polarization angle of the prior crystal θ(n−1) as expressed in the following Equation 6.

$$\theta_n = \Phi n + (\Phi n - \theta_{(n-1)}) = 2\Phi_n - \theta_{(n-1)} \quad \text{Equation VI}$$

Where the stack is composed of an even number of crystals, the incident polarization angle of the incoming light beam on the first crystal of the stack may be arbitrarily chosen, although 0° is preferred. Where the stack is composed of an odd number of crystals, the incident polarization angle should be 0°, 90°, 180°, or 270°, with respect to the vertical. As the crystal number increases, the flat top transmission characteristic of the stack becomes more pronounced. For N=1, the response is sinusoidal.

Relatively few crystals are required in the stack to achieve a flat top transmission characteristic. This results from the fact that the transfer function from which these geometric relationships were derived combines a triangle wave and a flat top, as opposed to a rectangular wave. The former requires fewer terms to generate than the latter and thus fewer crystals. This is advantageous since it reduces the complexity, cost, and form factor of the resultant multiplexer. See S. E. Harris et al., *Optical Network Synthesis Using Birefringent Crystals*, JOURNAL OF THE OPTICAL SOCIETY OF AMERICA, VOLUME 54, Number 10, Octo-

TABLE II

| In/Out | | 1 | | 2 | | 3 | | 4 | | 5 | | 6 | |
|---|---|---|---|---|---|---|---|---|---|---|---|---|---|
| | IPv | Oa | Pv | Oa | Pv | Oa | Pv | Oa | Pv | Oa | Pv | Oa | Pv |
| FIG. 3AB | 0 | 45 | 90 | | | | | | | | | | |
| FIG. 3CD | | 22.5 | 45 | −22.5 | −90 | | | | | | | | |
| FIG. 3EF | 0 | 15 | 30 | −15 | −60 | −75 | −90 | | | | | | |
| FIG. 3GH | | 11.25 | 22.5 | −11.25 | −45 | −78.75 | −112.5 | 78.75 | −90 | | | | |
| FIG. 3IJ | 0 | 9 | 18 | −9 | −36 | −81 | −126 | 81 | −72 | −9 | −90 | | |
| FIG. 3KL | | 7.5 | 15 | −7.5 | −30 | −82.5 | 45 | 82.5 | −60 | 7.5 | 75 | −7.5 | −90 |

The equation for the angle of optical axis of each crystal of a stack of N crystals with FSR substantially equal to the grid or channel spacing is set forth in the following Equation 5.

ber 1964 for a general discussion of transfer functions related to birefringent crystals, which is hereby incorporated by reference as if fully set forth herein.

FIG. 3M is an enlarged side elevation view of a periodic filter fabricated from four crystals 340–350 as shown in FIG.

3H. Filters with the required periodicity may not also exhibit the proper phase relationship between the center of their pass bands and the gridlines of the telecommunications or other grid on which individual channels are centered. Therefore, it may be necessary to tune each individual crystal so that its pass bands are aligned with the ITU or other grid, as shown in FIGS. 2E–F. This may be achieved by tilting each crystal on either the fast or slow axis by an amount necessary to produce the required phase shift. Thus, crystal 340 is tilted by an angle 360, crystal 342 is tilted by an angle 362, crystal 364 requires no tilting, and crystal 346 is tilted by an angle 366.

FIGS. 4AB show an isometric side view and an end view of a periodic optical filter stack 452 fabricated from four discrete orthogonal orientations of a crystal with a fixed geometric relationship between its optic axis and each of its sides. Specifically, the optic axis is aligned at an angle of +/−11.25 degrees with respect to an internal normal to side 444, depending on which end the light beam is entering. Since the adjacent side 446 is orthogonal to side 444, the optic axis is aligned at +/−78.75 with respect to the internal normal to this side. These are precisely the angles called for in Equation 5 and shown in Table II. Thus, a stack of wave plates can be constructed from a single crystal mounted to a frame on either of two sides. In the example shown, crystal 340 may be mounted on side 446. Crystal 342 may be mounted on that same side, i.e., side 446, provided the crystal is rotated end-to-end 180 degrees around the z-axis to flip the angle of the optic axis with respect to the z-axis. The crystal 344 may be rotated 90 degrees around the y-axis and mounted on side 444. Crystal 346 may be mounted on that same side, i.e., side 444, provided the crystal is rotated end-to-end 180 degrees around the z-axis to flip the angle of the optic axis with respect to the z-axis. These relationships are shown in FIG. 4A.

As is evident from Equation 5 and Table II, as the number of crystals in the stack increases, the geometric orientations of the optic axis do not exceed four and those four may be obtained by the simple geometry set forth above. This allows all crystals to be side mounted on only one of two sides. Where $\Phi_1$ is the angular orientation of the optical axis of the first crystal in the stack with respect to the z-axis; the optic axis of the second crystal will be at an angle $-\Phi_1$ with respect to the z-axis; the third crystal at $\Phi_1$ with respect to the x-axis; and the fourth at $-\Phi_1$ with respect to the x axis. For the fifth crystal and higher the relationship repeats itself. This relationship may alternately be expressed as follows where again $\Phi_1$ is the angular orientation of the optical axis of the first crystal in the stack with respect to the z-axis.

| Crystal #1 | $\Phi_1$ |
| Crystal #2 | $\Phi_2 = -\Phi_1$ |
| Crystal #3 | $\Phi_3 = -(90° - \Phi_1)$ |
| Crystal #4 | $\Phi_4 = (90° - \Phi_1)$ |
| Crystal #5 | $\Phi_1$ . . . and so forth. |

This relationship is shown in FIG. 4B.

FIGS. 4CD show top and side elevation views of the periodic optical filter shown in FIGS. 4AB with a linear polarizer interface 450 to port 1, a periodic optical filter stack 452, and a beam displacer/combiner interface 454 to optical ports 2–3. The linear polarizer couples to the first port to linearly polarize arbitrarily polarized incoming light. The beam displacer/combiner interface displaces and combines orthogonally polarized odd and even channel components of an optical beam depending on the propagation direction of the light beam. The linear polarizer includes, in this embodiment of the invention, a lens 400, a polarization beam splitter/combiner 402 and polarization rotators 404AB. The lens focuses or collimates light depending on propagation direction of light. The polarization beam splitter combiner splits an arbitrarily polarized optical beam into component beams with orthogonal polarization vectors and combines two component beams with orthogonal polarization vectors into the optical beam depending on the propagation direction. The polarization rotators rotate component beams with orthogonal polarization vectors into linear alignment and rotate linearly aligned polarization vectors into orthogonal polarization vectors depending on the propagation direction. The periodic optical filter stack 452 includes birefringent crystals 340–346. The beam displacer/combiner interface includes a first beam angle turner 420AB, a second beam angle turner 422AB, a polarization rotator 424AB, a polarization beam splitter/combiner 426, and a lens 428. The beam angle turners turn the odd and even channel components of an optical beam through an angle such that the path of the odd and even channel components converge or diverge, depending upon the polarization direction of the odd and even channel components and the propagation direction. The polarization rotator rotates linearly aligned polarization vectors of the odd and even channel components into orthogonal polarization vectors and rotates odd and even channel components with orthogonal polarization vectors into linear alignment depending on the propagation direction. The polarization beam splitter/combiner combines separate odd and even channel components with orthogonal polarization vectors into the optical beam and splits an arbitrarily polarized optical beam into component beams with orthogonal polarization vectors depending on the propagation direction.

FIG. 4E shows polarization diagrams of light rays at various stages of the mux/demux shown in FIGS. 4CD. One of the odd/even channel components is shown with an open arrowhead while the other is shown with a closed arrowhead. The stages are numbered from 0–10 and correlate with sequential locations shown in FIGS. 4CD. In the following discussion, the operation of the mux/demux in the de-multiplexer mode is discussed. In this mode, light with component odd and even channels enters from port 1 and exits via ports 2 and 3 as separate component beams, one with substantially odd channels and the other with substantially even channels. The device may also perform as a multiplexer by simply reversing the direction of propagation of light. Thus, odd channels on one of ports 2–3 and even channels on the other of the ports 2–3 may be introduced to the device, whereupon interlaced odd and even channels will exit the device and enter port 1.

Polarization diagram "0" shows an arbitrarily polarized beam from port 1 which has been collimated by lens 400. Lens 400 serves to collimate the incoming light containing all channels, odd and even. In an embodiment of the invention a Gradient Index of Refraction Lens (GRIN) lens may be utilized. Next, light is passed through the polarization beam splitter/combiner 402. This element splits the arbitrarily polarized optical beam into component beams with orthogonal polarization vectors, as shown in polarization diagram "1". In an embodiment of the invention a birefringent crystal may be utilized. Subsequently, the two orthogonal polarization vectors are rotated into alignment by polarization rotator(s) 404AB, as shown in polarization diagram "2". In an embodiment of the invention a relatively thin, i.e., broadband, half wave plate which rotates both odd and even channels may be utilized. The two rays which form the output of the linear polarizer 450 contain both the odd and even channel components. Additionally, since they are derived from mutually orthogonal polarization vectors of the incoming light from port one, they collectively contain substantially all the power present in the original beam.

These discrete rays are passed to one end of the periodic filter stack 452. That end shall be identified as first I/O interface of the periodic filter stack. As shown in polarization diagrams 3–6, each successive crystal in the stack serves as a half plate to one of the odd and even channels in each of the two rays and as a whole wave plate to the other. The geometry of the optical axis of each crystal is such that the rays exit the opposite end of the stack, the second I/O interface, with orthogonally polarized odd and even channel components for each ray. This state is shown in polarization diagram "6".

Next, both rays are directed into the beam displacer/combiner and specifically to a pair of beam angle turners 420AB, 422AB. These elements turn the odd and even channel components through an angle thereby diverging/separating the odd and even components of each ray, as is shown in polarization diagram 7–8. In an embodiment of the invention these elements include birefrigent prism pairs (modified Woltson prisms as disclosed in co-pending U.S. patent application Ser. No. 09/135,083, filed Aug. 17, 1998 entitled "Compact Polarization Insensitive Circulators with Simplified Structure and Low Polarization Mode Dispersion " and U.S. patent application Ser. No. 09/383,591, filed Aug. 26, 1999 entitled "Compact Polarization Insensitive Circulators with Simplified Structure and Low Polarization Mode Dispersion " both of which are incorporated by reference as fully set forth herein. Then the components of each ray are passed through the polarization rotator(s) 422AB which orthogonalize the odd and even channel components of each ray. This state is shown in polarization diagram "9". Suitable elements for this function include the broadband half wave plate(s) discussed above. Then the rays and components are passed through the polarization beam splitter/combiner where the orthogonally polarized odd and even channel components are combined with their counterparts to form component beams entering ports 2–3 via GRIN lens 428.

The operation of the device may be reversed to perform as a multiplexer. Thus, mux/demux may perform as a multiplexer, as a de-multiplexer, or as a combined multiplexer/de-multiplexer.

FIGS. 5AB are isometric side and end views of a periodic filter set 500 which uses a folded propagation path through a 2 wave plate stack to achieve optical filtration equivalent to that associated with a 4 wave plate stack 452 (see FIGS. 4AE), and with a reduced form factor. The odd and even periodic filter bandpasses have flat tops substantially as pronounced as may be achieved with 4 discrete crystals. Crystals 340 and 342 are shown. A retroreflector 512 is optically coupled to the end of crystal 342 to create a return path through the stack shown in FIG. 5C. Two broadband half wave plates 510,514 are sandwiched between the retroreflector and the wave plate 342 to rotate the odd and even components by an appropriate amount so as to align them properly with the optical axis of wave plate 342 for the return path through that wave plate. The optical axis of wave plate 510 is aligned at 45 degrees to the vertical "z" axis in the z-y plane. The optical axis of wave plate 514 is aligned with the vertical "z" axis in the z-y plane.

FIG. 5D is a set of polarization diagrams of light rays at various stages of the periodic filter shown in FIGS. 5AB. Light enters the stack with two rays, each of which has odd and even components as shown in polarization diagram "2". Those rays enter at the first I/O interface on one end of wave plate 340. On the same end of the wave plate, a second I/O interface is formed where the component beams with orthogonal odd and even polarization vectors exit the stack.

The embodiment shown in FIGS. 5AD may be combined with the linear polarizer 450 and the polarization beam displacer/combiner 454 (See FIGS. 4CE). Folding of the beam path may be implemented on stacks with one wave plate up to N wave plates, with the advantage of a flat top filter characteristic corresponding to a higher order stack, i.e. a stack with a greater number of wave plates, but at a substantially reduced form factor.

FIGS. 6AB are isometric side and end views of a periodic filter set 652 with an alternate side-by-side embodiment to the 2 wave plate stack with folded beam path shown in FIGS. 5AB. Optical filtration equivalent to that associated with a 4 wave plate stack 452 (see FIGS. 4AE) is achieved and with a reduced form factor. Wave plates 342 and 346 are shown. Three retroreflectors 602–606 bend light rays on the path shown in FIG. 6C, with the light passing twice through each wave plate. Retroreflector 602 bends the rays back through wave plate 346. Retroreflector 606 bends the rays from wave plate 346 onto a return path through wave plate 342. Retroreflector 604 bends the rays back through wave plate 342.

FIG. 6D is a polarization diagram set 2–6 of light rays at various stages of the periodic filter shown in FIGS. 6AB. Light which enters with both components, odd and even, linearly polarized, exits with two component beams one with the odd channels and the other with the even.

Figure 6E:
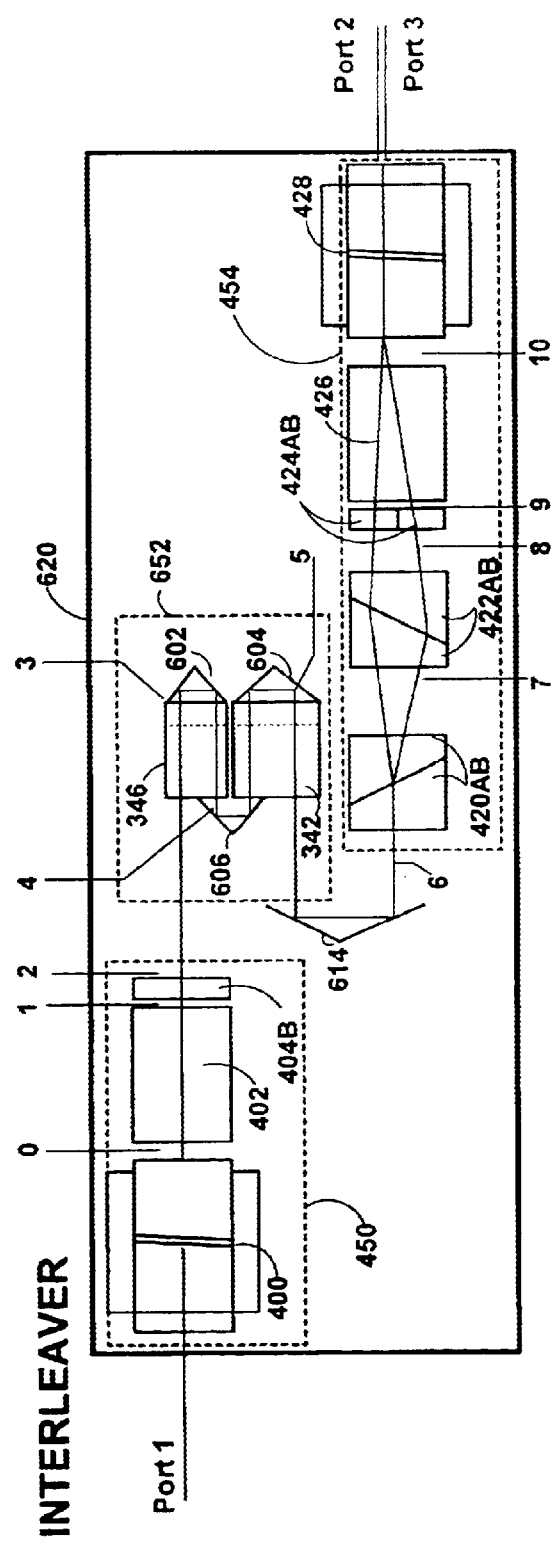
FIG. 6E is a top elevation view of the periodic optical filter shown in FIGS. 6AB with interfaces to optical ports for multiplexing or de-multiplexing optical signals.

FIG. 6E is a top elevation view of the periodic optical filter stack 652 with a folded propagation path shown in FIGS. 6AB with interfaces to optical ports for multiplexing or de-multiplexing optical signals. The linear polarization interface 450 is shown coupled to the first I/O interface of the stack 652, while the beam displacer/combiner 454 is coupled to the second I/O interface of the stack 652 via a retroreflector 614.

Figure 6F:
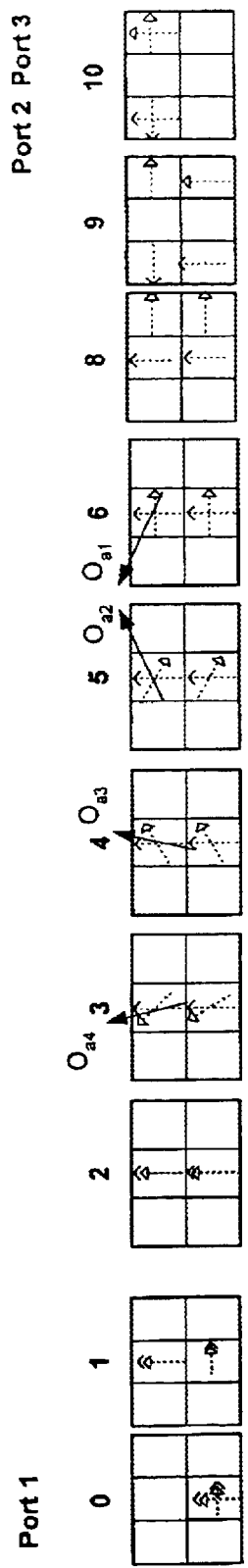
FIG. 6F shows polarization diagrams of light rays at various stages of the mux/demux shown in FIG. 6E.

FIG. 6F shows polarization diagrams of light rays at various stages of the mux/demux shown in FIGS. 6E.

Figure 7A:
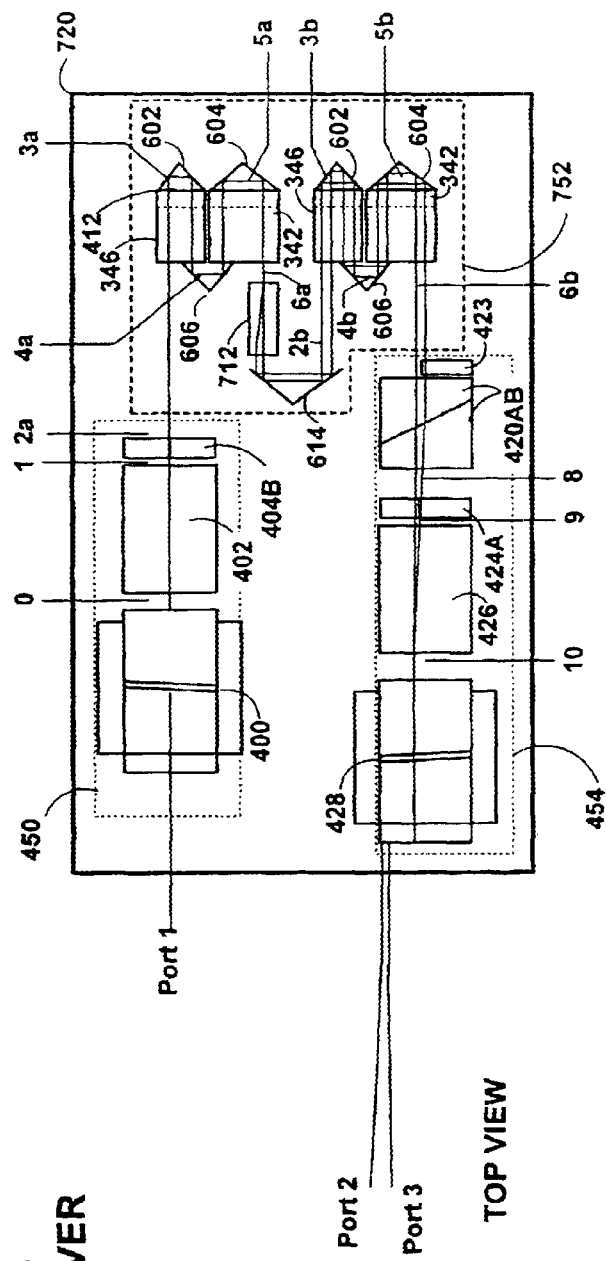
FIG. 7A is a top plan view of an alternate embodiment of the mux/demux shown in FIG. 6E.
Figure 7B:
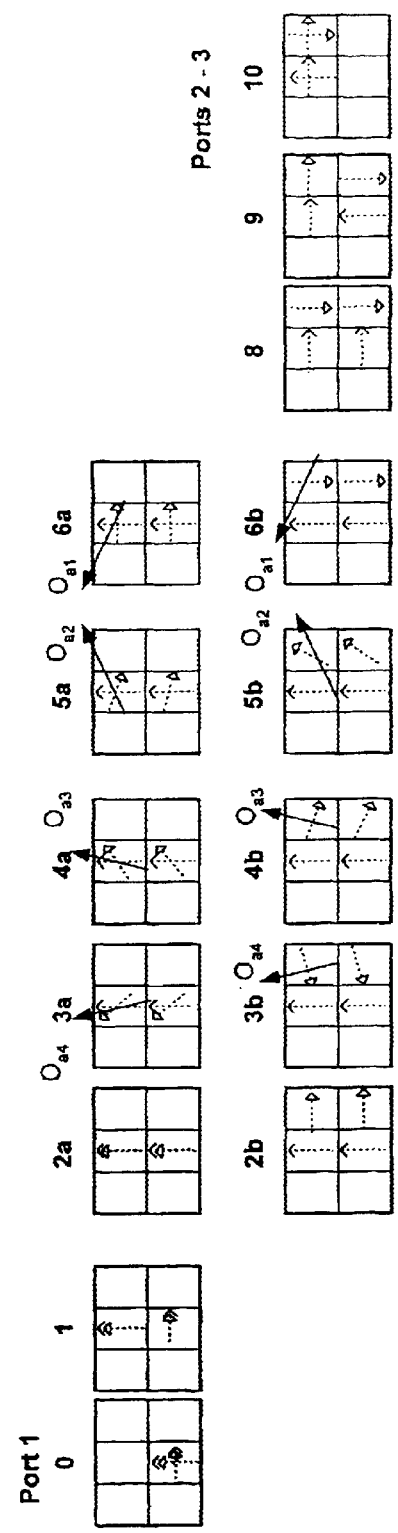
FIG. 7B shows polarization diagrams of light rays at various stages of the mux/demux shown in FIG. 7A.

FIG. 7A is a top plan view of a mux/demux 720 which is an alternate embodiment of the mux/demux shown in FIG. 6E. The optical stack 752 uses two wave plate stacks each with folded propagation paths. Each is similar to that shown in FIGS. 6A and 6E. This staging increases isolation between odd and even channels. FIG. 7B shows polarization diagrams of light rays at various stages of the mux/demux shown in FIG. 7A. Light from port 1 is passed through linear polarizer 450 to the first I/O interface of the side-by-side stack composed of wave plates 342,346. Upon exiting this stack at the location referenced "6a" (See polarization diagram 6a), the odd and even components of each of the two rays have been orthogonalized. Next they pass through a beam splitter/combiner 712, e.g., a birefringent crystal oriented to walk off e- and o-rays. Then the component beams, which are now separate and orthogonal, are directed by retroreflector 614 back into the second stage of periodic filtering performed again by a second set of wave plates 342,346.

At interface 2b shown in polarization diagram "2b", odd channels are horizontally polarized with a small amount of even channel signals still remaining. During propagation through the second stage of periodic filters, the polarization direction of one of the odd/even channels will be rotated while the other of the odd/even channels will not be affected. This further improves isolation and reduces cross talk between channels. Light exits the second stage at the second I/O interface labeled 6b (See polarization diagram "6b") with odd and even components of both rays separated and linearly polarized. Those rays pass to beam displacer/combiner 454 for passage to ports 2–3. Since the component rays have already been separated by splitter/combiner 712, only a single beam bender 420A/B is required to orthogonally polarize the components of each ray. A polarization rotator 423 serves to rotate one pair of the component beams prior to entering the beam bender.

The end result of the above-discussed arrangement is improved channel isolation with reduced cross talk. As with all the embodiments discussed above, the operation of this embodiment as well may be reversed to serve as either a multiplexer, a de-multiplexer or a combined mux/demux.

FIGS. 8AB are isometric side views and an end view respectively of a periodic optical filter comprising two wave plates 320–322. The FSR of each wave plate is substantially equal to the channel spacing in the selected wavelength grid, e.g., the ITU grid shown in FIG. 2. The optical axis of wave plates 320–322 are aligned at +22.5 degrees and −22.5 degrees with respect to the vertical "z" axis, as discussed above in connection with Equation V and Table II. Once the stack is tuned into alignment with the selected grid, linearly polarized light with interlaced odd and even channel components is converted to orthogonally polarized light with periodic odd and even components substantially separated onto separate ones of the orthogonal polarization vectors. This state is not temperature invariant.

Thermal Stabilization

Temperature variations in a mux/demux may result from the environment or from the power transmitted through the device. The center wavelengths of each periodic pass band slip with temperature, in the case of YVO4, it is about 35 pm/° C. This can result in the periodic odd and even pass bands of the periodic filter stack moving out of alignment with the selected grid, e.g., the ITU grid. This misalignment results in attenuation of signal strength, crosstalk and ultimately loss of transmission/reception capability until the stack returns to its original temperature.

One solution is to actively stabilize the temperature of the multiplexer/de-multiplexer using a heater or cooler and a closed loop feedback of temperature or wavelength. This solution is expensive and increases the form factor of the mux/demux.

Another solution is to passively thermally stabilize each wave plate. In order to achieve this result in the broadband wave plate stacks of the current invention, it is necessary that both of the following conditions be satisfied.

Each wave plate must continue to serve as a ½ wave plate to one of the odd and the even channels and a whole wave plate to the other of the odd and even channels during temperature variations. This requirement is fulfilled when the first derivative of FSR with respect to temperature is substantially zero. One convenient way of achieving this result is to fabricate each wave plate from at least a pair of dissimilar birefringent materials which collectively serve as ½ and whole wave plates to the odd and even channels.

Figure 8D:
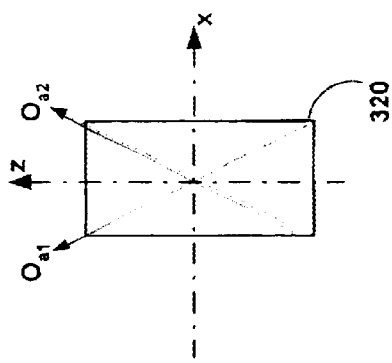
FIGS. 8AB are isometric side views and an end view respectively of a periodic optical filter comprising two wave plates.
FIGS. 8CD are isometric side and end views of an alternate embodiment of the invention showing a periodic optical filter comprising two wave plates each of which incorporates passive thermal compensation.
FIGS. 8EF are isometric side and end views of an alternate geometry for passive thermal compensation to that shown in FIGS. 8CD.
Figure 8F:
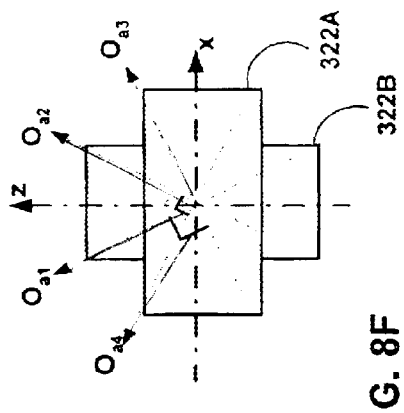
Figure 8C:
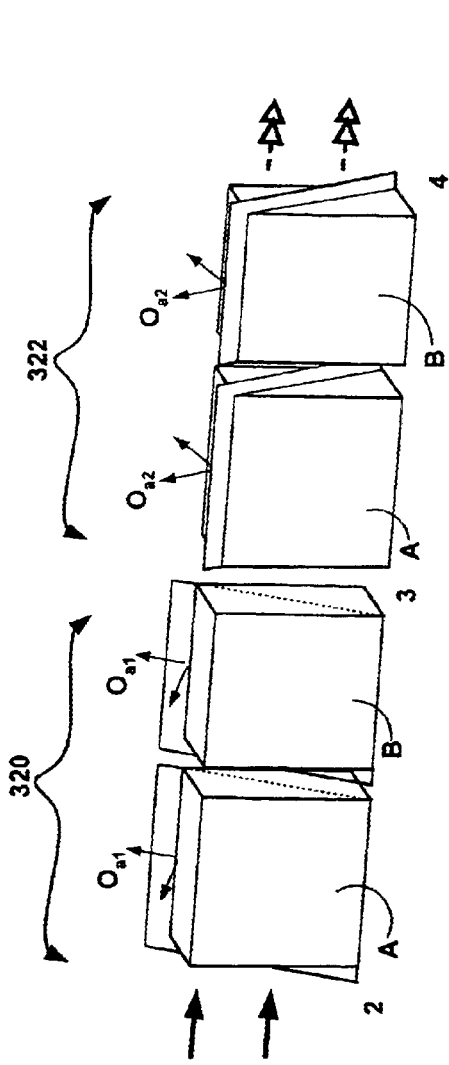

FIGS. 8CD are isometric side and end views of an alternate embodiment of the invention showing a periodic optical filter comprising two wave plates, each of which incorporates passive thermal compensation. In FIG. 8C two wave plates 320–322 are shown. Wave plate 320 is fabricated from a first pair of crystals 320A, the primary crystal and 320B the compensating crystal. The collective FSR of the crystal pair is substantially equal to the spacing between channels in the selected wavelength grid. Those crystals have substantially identically oriented optical axis at 22.5 degrees with respect to the vertical or "z" axis as set forth above in connection with Equation V and Table II and as shown in FIG. 8D. The second wave plate 322 is fabricated from a second pair of crystals 322A, the primary crystal and 322B the compensating crystal. The collective FSR of this crystal pair as well is substantially equal to the spacing between channels in the selected wavelength grid. These crystals have substantially identically oriented optical axis at −22.5 degrees with respect to the vertical or "z" axis, as set forth above in connection with Equation V and Table II and as shown in FIG. 8D. The compensating crystals of each wave plate compensate the primary crystal by providing a temperature related variation in their optical path length difference between e and o rays which offset the temperature related variation in the optical path length difference in the primary crystal. As shown in Table III the geometric orientation shown in FIG. 8C with the optical axis of the primary and compensating crystal members of each wave plate aligned is appropriate, only if the crystal pairs exhibit offsetting optical path length differences as a function of temperature in that orientation. Compensating materials for YVO4 for which parallel alignment of optical axis of the primary and compensating crystals are appropriate are shown in row 11 of Table 3 without highlighting. These include: LiNbO$_3$, KTP or Calcite. The remaining materials shown in Table 3, i.e. a-BBO, Crystalline Quartz and Rutile can also be used to compensate YVO4 but a different geometry of the optical axis of the primary and compensating crystals is called for. That geometry is shown in FIGS. 8EF.

Figure 8E:
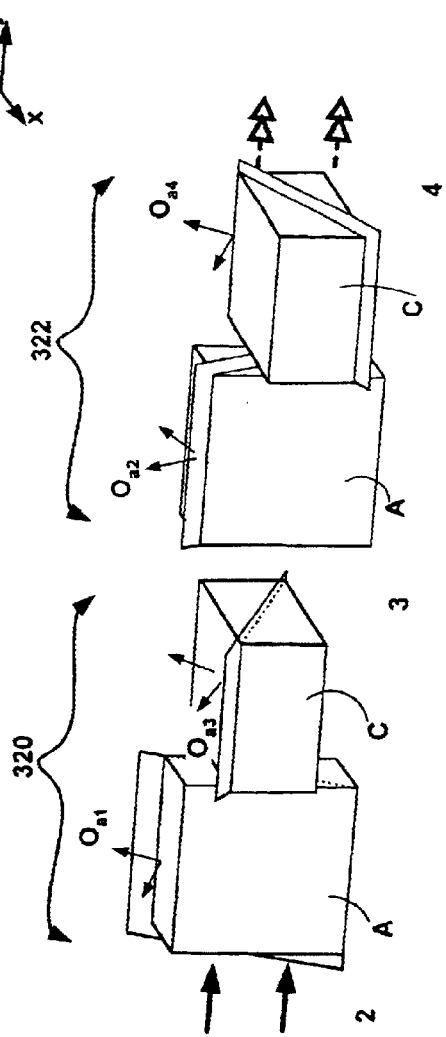

FIGS. 8EF are isometric side and end views of an alternate embodiment of the invention showing a periodic optical filter comprising two wave plates each of which incorporates passive thermal compensation. In FIG. 8E two wave plates 320–322 are shown. Wave plate 320 is fabricated from the primary crystal 320A and the compensating crystal 320C. The collective FSR of the crystal pair is substantially equal to the spacing between channels in the selected wavelength grid. Unlike the arrangement shown in FIG. 8C, the optical axes of this pair are orthogonal to each other. The optical axis of the primary crystal 320A remains at 22.5 degrees with respect to the vertical or "z" axis while the optical axis of the compensating crystal 320C is oriented at 112.5 or −67.5 degrees with respect to the "z" axis. The second wave plate 322 is fabricated from a second pair of crystals 322A, the primary crystal and 322B the compensating crystal. The collective FSR of this crystal pair as well is substantially equal to the spacing between channels in the selected wavelength grid. These crystals 322AC as well have orthogonal optical axis at −22.5 degrees and 67.5 degrees with respect to the vertical or "z" axis. The remaining materials shown in Table 3, i.e. a-BBO, Crystalline Quartz and Rutile can be used to compensate YVO$_4$ in this orthogonal orientation of optical axis of the primary and compensating crystals. This geometry reverses the sign of the optical pathlength difference of the compensating crystal so as to offset the change in the optical pathlength of the primary crystal as a function of temperature.

The thermally stabilized embodiments of the periodic optical filters shown in FIGS. 8CF may be combined with the linear polarizer 450 and the polarization beam displacer/combiner 454 (See FIGS. 4CE) to form a mux/demux, in accordance with the current invention.

It is not necessary to practice the invention that all the wave plates in a stack be fabricated from identical pairs of dissimilar materials. In still other embodiments of the invention, the first wave plate might have different compensating crystals or even different primary, as well as compensating crystals. Thus the stack might exhibit for one wave plate optical axis alignment for the primary and compensating crystals, and orthogonalized optical axis for the primary and compensating crystals of another wave plate in the stack.

The geometric orientation of the optic axis of each crystal may be arranged so that both the primary and compensating crystals of a stack with N wave plates may be mounted on either of two sides of each crystal, thus maintaining the simple geometry discussed above in connection with FIGS. 4AB. The primary and compensating crystals may be spaced apart by a gap or may contact one another without departing from the scope of the claimed invention.

Once the stacks shown in FIGS. 8CD and 8EF are tuned into alignment with the selected grid, linearly polarized light with interlaced odd and even channel components is converted to orthogonally polarized light with periodic odd and even components substantially separated onto separate ones of the orthogonal polarization vectors. Tuning, as discussed above, is accomplished by tilting either/both the primary and compensating crystals of the stack.

Dimensioning of the Primary and Compensating Crystals

The wave plates 320 and 322 must each be fabricated from dissimilar birefringent materials dimensioned so as to serve collectively as ½ and whole wave plates to the odd and even channels. The free spectral range of each of these pairs of primary and compensating birefringent materials is expressed in the following Equation VII:

$$FSR = \left(\frac{1}{2}\right)\left(\frac{c}{|\Delta n_1 L_1 \pm \Delta n_2 L_2)|}\right)$$

$$= \left(\frac{1}{2}\right)\left(\frac{c}{|((n_{e1}-n_{o1})L_1 \pm (n_{e2}-n_{o2})L_2)|}\right)$$

where L is the length of material. The subscripts 1 and 2 denote the primary and compensating birefringent materials respectively.

Now the condition to be satisfied is that the FSR be a constant equal to the channel spacing, e.g., 100 GHz, and that d(FSR)/dT equal substantially zero. This latter condition is satisfied when the derivative of the denominator equals zero as set forth in the following Equation VIII:

$$\frac{d(\Delta n_1 L_1 \pm \Delta n_2 L_2)}{dT} =$$
$$L_1 \frac{d\Delta n_1}{dT} + L_1 \alpha_1 \Delta n_1 \pm \left(L_2 \frac{d\Delta n_2}{dT} + L_2 \alpha_2 \cdot \Delta n_2\right) = 0$$

Equation VIII where α is the thermal expansion coefficient of either the primary or compensating birefringent crystal as denoted by the subscripts 1 and 2 respectively. Any dissimilar birefringent materials can be utilized. With the two equations, VII and VIII, the two unknowns, L1 the length of the primary birefringent crystal and L2 the length of the compensating birefringent crystal can be determined. Both monoaxial and biaxial birefringents may be used to construct thermally stabilized wave plates. Some of the many suitable birefringent materials and their relevant parameters are shown in the following Table III.

values rounded to two decimal points. The change in refractive index as a function of temperature for the o- and e-axis is set forth in rows 4–5. Row 7 sets forth the coefficient of thermal expansion for the material. The parameters for a-BBO are approximate since measured at 1064 nm. Rows 9 and 10 show calculated lengths for the primary and compensating birefringent crystals of a wave plate with a FSR of 100 GHz. Any birefringent materials can be used to compensate, provided only that the optical axis of the primary and compensator are either aligned with one another or orthogonal to one another as shown in row 11.

EXAMPLE a

If we choose for the primary material $YVO_4$ and for the compensating material crystalline Quartz and a FSR for the pair of 100 GHz and substitute the corresponding parameters from Table III into Equation VII we have:

$$100\, Ghz = \left(\frac{1}{2}\right)\left(\frac{3 \times 10^8_{m/s}}{(0.2L_1 - 0.0085L_2)}\right)$$

Equation VIIa

A similar substitution of values from Table III into Equation VIII results in the following equality:

$$L_1(3.0-8.5)\times10^{-6}+L_1(4.43\times10^{-6})(2.14-1.94)-L_2(-6.5+5.5)\times10^{-6}-L_2(13.37\times10^{-6})(1.53-1.52)=0$$

Equation VIIIa which reduces to $L_1=0.19L_2$. Then, substituting back into equation VIIa yields:

$$100 \times 10^9 \tfrac{cycle}{s} = \left(\frac{1}{2}\right)\left(\frac{3 \times 10^8_{m/s}}{(0.2(0.19L_2) - 0.0085L_2)}\right) = \frac{3 \times 10^8_{m/s}}{0.062L_2}$$

Therefore L2=48.66 mm and L1=9.38 mm and the optical axis are orthogonal to one another as shown in FIGS. 8EF.

The foregoing description of preferred embodiments of the invention has been presented for purposes of illustration and description. It is not intended to be exhaustive or to limit the invention to the precise forms disclosed. Obviously many modifications and variations will be apparent to prac-

TABLE III

| 1 | @1550 nm | $YVO_4$ | $LiNbO_3$ | KTP | a-BBO* | Calcite | Crystal Quartz | Rutile |
|---|---|---|---|---|---|---|---|---|
| 2 | $n_o$ | 1.94 | 2.21 | $n_x$, 1.72<br>$n_y$, 1.73 | 1.65 | 1.63 | 1.52 | 2.45 |
| 3 | $n_e$ | 2.14 | 2.13 | $n_z$, 1.81 | 1.58 | 1.47 | 1.53 | 2.70 |
| 4 | $\frac{dn_o}{dT} \times 10^{-6}$ | 8.50 | 4.12 | 6.10<br>8.30 | (−9.30) | 2.10 | (−5.50) | (−43.60) |
| 5 | $\frac{dn_e}{dT} \times 10^{-6}$ | 3.00 | 35.08 | 14.50 | (−16.60) | 11.85 | (−6.50) | (−86.00) |
| 7 | $\alpha \times 10^{-6}$ | 4.43 | 14.40 | 0.60 | 4.00 | 26.31 | 13.37 | 7.44 |
| 9 | Primary = $YVO_4$ L(mm) @ 100 GHz FSR | | 7.79 | $5.98_{xz}$<br>$5.73_{yz}$ | 6.04 | 19.66 | 9.38 | 8.58 |
| 10 | Compensator L(mm) @ 100 GHz FSR | | 1.20 | $3.25_{xz}$<br>$4.21_{yz}$ | 3.66 | 16.03 | 48.66 | 0.97 |
| 11 | Primary Axis | o< >e | o< >e | o< >e | o< >e | o< >e | o< >e | o< >e |
|   | Compensator axis | o< >e | o< >e | e< >o | o< >e | e< >o | e< >o | |

For each material its refractive index at 1550 nm on the o and e axis are set forth in rows 2–3 respectively, with the

What is claimed is:

1. An optical device for operating upon optical signals between a first port communicating odd channels and even channels and a second port communicating the odd channels together with a third port communicating the even channels, and adjacent orders of the odd and even channels evenly spaced apart and each centered on a corresponding gridline of a selected wavelength grid; and said optical device comprising;

a linear polarizer coupled to the first port for linearly polarizing optical signals;

at least one wave plate with a first and a second I/O interface, and the at least one wave plate optically coupled at a first I/O interface to the linear polarizer, and the at least one wave plate rotating both odd and even channel components of an optical beam between a linear and an orthogonal relationship depending on the propagation direction, and the at least one wave plate including:

a) a primary birefringent element with a selected first length $L_1$ and first indices $n_{o1}$, $n_{e1}$ of refraction; and b) a compensating birefringent element with a selected second length $L_2$ and a second indices $n_{o2}$, $n_{e2}$ of refraction distinct from the first indices of refraction, and the first length, the second length, the first indices of refraction and the second indices of refraction together determinative both of a free spectral range for the at least one wave plate corresponding to a spacing between adjacent gridlines of the selected wavelength grid, and determinative as well as of a combined optical pathlength difference for the wave plate substantially invariant with respect to temperature; and a beam displacer/combiner, optically coupling the second I/O interface of the at least one wave plate with both the second port and the third port, and the beam displacer/combiner displacing and combining orthogonally polarized odd and even channel components of an optical beam depending on a propagation direction.

2. The optical device of claim 1, wherein the linear polarizer further comprises:

a polarization beam splitter/combiner that splits an arbitrarily polarized optical beam into component beams with orthogonal polarization vectors and combines two component beams with orthogonal polarization vectors into the optical beam depending on the propagation direction; and a polarization rotator that rotates component beams with orthogonal polarization vectors into linear alignment and rotates linearly aligned polarization vectors into orthogonal polarization vectors depending on the propagation direction.

3. The optical device of claim 1, wherein the orientation of the at least one wave plate includes tilting of a normal to a surface of the at least one wave plate with respect to an optical path of the optical beam to provide tuning to even symmetry with the selected wavelength grid.

4. The optical device of claim 1, wherein the first length $L_1$, the second length $L_2$, the first indices of refraction at least $n_{o1}$, $n_{e1}$, the second indices of refraction $n_{o2}$, $n_{e2}$ substantially correspond to one another as follows:

$$FSR = \left(\frac{1}{2}\right)\left(\frac{c}{|((n_{e1} - n_{o1})L_1 \pm (n_{e2} - n_{o2})L_2)|}\right)$$

where c corresponds with the speed of light in a vacuum and FRS corresponds to a spacing between adjacent odd and even channels.

5. The optical device of claim 4, wherein the primary birefringent element includes a first optic axis and the compensating birefringent element includes a second optic axis and the "+" sign corresponds to the case that the first optic axis oriented with respect to the second optic axis in one of a substantially parallel orientation and the "−" sign corresponds to the case that the first optic axis oriented with respect to the second optic axis in one of a substantially orthogonal orientation.

6. The optical device of claim 4, wherein the first length $L_1$, the second length $L_2$, the first indices of refraction at least $n_{o1}$, $n_{e1}$, the second indices of refraction $n_{o2}$, $n_{e2}$ substantially correspond to one another as follows:

$$\frac{d((n_{e1} - n_{o1})L_1 \pm (n_{e2} - n_{o2})L_2)}{dT} = 0$$

where T corresponds with temperature.

7. The optical device of claim 6, wherein the primary birefringent element includes a first optic axis and the compensating birefringent element includes a second optic axis and the "+" sign corresponds to the case that the first optic axis oriented with respect to the second optic axis in one of a substantially parallel orientation and the "−" sign corresponds to the case that the first optic axis oriented with respect to the second optic axis in one of a substantially orthogonal orientation.

8. The optical device of claim 1, wherein the primary birefringent element includes a first optic axis and the compensating birefringent element includes a second optic axis and the first optic axis oriented with respect to the second optic axis in one of a substantially parallel orientation and an orthogonal orientation.

9. The optical device of claim 1, wherein the at least one wave plate operates as a half wave plate with respect to one of the odd channels and the even channels and a whole wave plate with respect to an other of the odd and the even channels.

10. The optical device of claim 1, wherein the primary birefringent element and the secondary birefringent element of the at least one wave plate comprise distinct ones of a group of birefringent materials including: YVO4, LiNbO3, KTP, a-BBO, Calcite, Crystal Quartz and Rutile.

11. The optical device of claim 1, wherein the beam displacer combiner further comprises:

at least one beam angle turner optically coupled to the second I/O interface of the at least one wave plate for turning the odd and even channel components of an optical beam through an angle, wherein the path of the odd and even channel components converges or diverges depending upon the polarization direction of the odd and even channel components and the propagation direction;

a polarization rotator that rotates linearly aligned polarization vectors of the odd and even channel components into orthogonal polarization vectors and rotates odd and even channel components with orthogonal polarization vectors into linear alignment depending on the propagation direction; and a polarization beam splitter/combiner that combines separate odd and even channel components with orthogonal polarization vectors into the optical beam and splits an arbitrarily polarized optical beam into component beams with orthogonal polarization vectors depending on the propagation direction.

12. An optical telecommunications system comprising the optical device of claim 1.

13. The optical telecommunications system of claim 12, wherein the optical telecommunication system comprises at least one of, a wavelength division multiplexer, a wavelength division de-multiplexer, and an optical router.

14. The optical device of claim 1, wherein the at least one wave plate comprises a plurality of wave plates and each of the plurality of wave plates including the primary birefringent element and the compensating birefringent element.

15. The optical device of claim 14, wherein a polarization vector of the optical beam at the first I/O interface defines the z axis of an x-y-z Cartesian coordinate system, with propagation of the optical beam along the y-axis and with the optical axis of successive ones of the primary birefringent elements of the plurality of wave plates substantially oriented at one of a positive angle and a negative angle $\Phi n$ with respect to one of the y-axis and the x-axis, where an angle $\Phi_1$ about the y-axis corresponds with the orientation of the optical axis of a first of the primary birefringent elements of the plurality of wave plates with respect to the polarization vector and n is an integer corresponding to the relative ordering of each one of the plurality of wave plates.

16. The optical device of claim 15, wherein the optical axis of each successive one of the primary birefringent elements of the plurality of wave plates commencing with a first of the primary birefringent elements of the plurality of wave plates substantially exhibit the following cyclic relationship expressed as rotations of the successive optical axis of each successive primary birefringent element of the plurality of wave plates about the y axis:

a) the positive angle $\Phi n$ about the z-axis followed by
b) the negative angle $\Phi n$ about the z-axis, followed by
c) the positive angle $\Phi n$ about the y-axis, followed by
d) the negative angle $\Phi n$ about the y-axis; and again up to a last of the plurality of wave plates.

17. The optical device of claim 14, wherein the an angular orientation $\Phi n$ of an optical axis of an $n^{th}$ one of a total of N of the primary birefringent elements of the plurality of wave plates with respect to the input polarization vector corresponds with the following expression where N is the total number of the plurality of wave plates, n is an integer corresponding to the relative ordering of each one of the plurality of wave plates and i is an integer including zero;

$$\Phi_n = (-1)^n \left[ \frac{\Pi}{4} \times \left\{ \left( n + \frac{1 + 3 \times ((-1)^n)}{2} \right) - \frac{2i+1}{N} \right\} \right].$$

18. The optical device of claim 14, wherein each of the plurality of wave plates further comprises:
at least one beam folder for reducing a number of the plurality of wave plates by folding a propagation path of the optical beam at least twice through at least a selected one of the plurality of wave plates.

19. The optical device of claim 18, wherein the propagation path includes opposing propagation directions through at least the selected one of the plurality of wave plates.

20. The optical device of claim 14, wherein a polarization vector of the optical beam at the first I/O interface exhibits an arbitrary alignment with respect to the z axis of an x-y-z Cartesian coordinate system, with propagation of the optical beam along the y axis and with an even number of the plurality of wave plates.

21. A method for splitting/combining odd and even channels of an optical beam between a first port communicating odd channels and even channels and a second port communicating the odd channels together with a third port communicating the even channels, and adjacent orders of the odd and even channels evenly spaced apart and each centered on a corresponding gridline of a selected wavelength grid; and said method for splitting/combining comprising;

linearly polarizing the optical beam at the first port;

relatively retarding an e-ray and an o-ray component of the optical beam by a primary amount and a compensating amount and a sum of the primary amount and the compensating amount substantially invariant with respect to temperature, and the sum corresponding to an integer multiple of $2\pi$ of a one of the odd channels and the even channels and to odd integer multiples of $\pi$ for an other of the odd channels and the even channels, both at a free spectral range corresponding to the spacing between gridlines of the selected wavelength grid, to rotate odd and even channel components of the optical beam between a linear and an orthogonal relationship depending on the propagation direction; and displacing and combining orthogonally polarized odd and even channel components of an optical beam depending on a propagation direction.

22. The method for splitting/combining of claim 21, wherein the act of linearly polarizing further comprises the acts of:

splitting an arbitrarily polarized optical beam into component beams with orthogonal polarization vectors and combining two component beams with orthogonal polarization vectors into the optical beam depending on the propagation direction; and rotating component beams with orthogonal polarization vectors into linear alignment and rotating linearly aligned polarization vectors into orthogonal polarization vectors depending on the propagation direction.

23. The method for splitting/combining of claim 21, wherein the act of relatively retarding further comprises the act of:
tuning the odd and even channels to even symmetry with the selected wavelength grid.

24. The method for splitting/combining of claim 21, wherein the act of relatively retarding further comprises the act of:
successively relatively retarding the e-ray and o-ray components of the optical beam.

25. The method for splitting/combining of claim 24, wherein the act of successively relatively retarding the e-ray and o-ray components further comprises the act of:
folding a propagation path of the optical beam.

26. The method for splitting/combining of claim 21, wherein the displacing and combining acts further comprise the acts of:

turning the odd and even channel components of an optical beam through an angle, wherein the path of the odd and even channel components converge or diverge depending upon the polarization direction of the odd and even channel components and the propagation direction;

rotating linearly aligned polarization vectors of the odd and even channel components into orthogonal polarization vectors and rotating odd and even channel components with orthogonal polarization vectors into linear alignment depending on the propagation direction; and separating odd and even channel components with orthogonal polarization vectors into the optical beam and splitting an arbitrarily polarized optical beam into component beams with orthogonal polarization vectors depending on the propagation direction of the optical beam.

27. An optical device for operating upon optical signals including odd and even channels, and adjacent orders of the odd and even channels evenly spaced apart and each centered on a corresponding gridline of a selected wavelength grid; and said optical device comprising;

at least one wave plate with a first and a second I/O interface, and the at least one wave plate, and the at least one wave plate to rotate both odd and even channel components of an optical beam between a linear and an orthogonal relationship depending on the propagation direction, and the at least one wave plate including:
  a) a primary birefringent element with a selected first length $L_1$ and first indices $n_{o1}$, $n_{e1}$ of refraction; and
  b) a compensating birefringent element with a selected second length $L_2$ and a $n_{o2}$, $n_{e2}$ second indices of refraction distinct from the first indices of refraction, and the first length, the second length, the first indices of refraction and the second indices of refraction together determinative both of a free spectral range for the at least one wave plate corresponding to a spacing between adjacent gridlines of the selected wavelength grid, and determinative as well as of a combined optical path length difference for the wave plate substantially invariant with respect to temperature.

28. The optical device of claim 27, wherein the first length $L_1$, the second length $L_2$, the first indices of refraction at least $n_{o1}$, $n_{e1}$, the second indices of refraction at least $n_{o2}$, $n_{e2}$ substantially correspond to one another as follows:

$$FSR = \left(\frac{1}{2}\right)\left(\frac{c}{|(n_{e1} - n_{o1})L_1 \pm (n_{e2} - n_{o2})L_2|}\right)$$

where c corresponds with the speed of light in a vacuum and FRS corresponds to a spacing between adjacent odd and even channels.

29. The optical device of claim 27, wherein the primary birefringent element includes a first optic axis and the compensating birefringent element includes a second optic axis and the "+" sign corresponds to the case that the first optic axis oriented with respect to the second optic axis in one of a substantially parallel orientation and the "−" sign corresponds to the case that the first optic axis oriented with respect to the second optic axis in one of a substantially orthogonal orientation.

30. The optical device of claim 27, wherein the first length $L_1$, the second length $L_2$, the first indices of refraction at least $n_{o1}$, $n_{e1}$, the second indices of refraction at least $n_{o2}$, $n_{e2}$ substantially correspond to one another as follows:

$$\frac{d((n_{e1} - n_{o1})L_1 \pm (n_{e2} - n_{o2})L_2)}{dT} = 0$$

where T corresponds with temperature.

31. The optical polarization rotator of claim 27, wherein the primary birefringent element includes a first optic axis and the compensating birefringent element includes a second optic axis and the "+" sign corresponds to the case that the first optic axis oriented with respect to the second optic axis in one of a substantially parallel orientation and the "−" sign corresponds to the case that the first optic axis oriented with respect to the second optic axis in one of a substantially orthogonal orientation.

32. An optical device for operating upon optical signals between a first port communicating odd channels and even channels and a second port communicating the odd channels together with a third port communicating the even channels, and adjacent orders of the odd and even channels evenly spaced apart and each centered on a corresponding gridline of a selected wavelength grid; and said optical device comprising;

a linear polarizer coupled to the first port for linearly polarizing the optical signals;

a plurality of crystals oriented to intersect a path of an optical beam, and the plurality of crystals including a first and a second I/O interface, and the plurality of crystals coupled at a first I/O interface to the linear polarizer, and the plurality of crystals rotating both odd and even channel components of an optical beam between a linear and an orthogonal relationship depending on the propagation direction and substantially independent of a polarization orientation of the linearly polarized optical signals at the first I/O interface.

* * * * *